(12) United States Patent
Etzler et al.

(10) Patent No.: US 12,136,803 B2
(45) Date of Patent: Nov. 5, 2024

(54) MULTI-LINE SUSPENDING BRACKET

(71) Applicant: PREFORMED LINE PRODUCTS CO., Mayfield Village, OH (US)

(72) Inventors: Andrew John Etzler, Streetsboro, OH (US); John Lee Jones, Independence, OH (US); Jacob Jeffrey Palmer, Chesterland, OH (US); Benjamin Franklin Ciesielczyk, Madison, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/551,336

(22) Filed: Dec. 15, 2021

(65) Prior Publication Data

US 2023/0187917 A1 Jun. 15, 2023

(51) Int. Cl.
*H02G 7/05* (2006.01)
*F16L 3/02* (2006.01)
*F16L 3/22* (2006.01)
*H02G 1/04* (2006.01)
*H02G 7/02* (2006.01)

(52) U.S. Cl.
CPC ............... *H02G 7/053* (2013.01); *F16L 3/02* (2013.01); *F16L 3/222* (2013.01); *H02G 1/04* (2013.01); *H02G 7/02* (2013.01)

(58) Field of Classification Search
CPC .......... H02G 7/053; H02G 7/05; H02G 7/06; H02G 7/056; B63B 21/045
USPC .................................... 248/58, 218.4, 219.2
See application file for complete search history.

(56) References Cited

U.S. PATENT DOCUMENTS

| | | | | |
|---|---|---|---|---|
| 2,454,677 | A * | 11/1948 | Smalley ................ | H01B 17/24 174/149 R |
| 3,568,968 | A * | 3/1971 | Taylor ..................... | H02G 7/20 D8/364 |
| 3,957,238 | A * | 5/1976 | Bourrieres .............. | H02G 7/20 174/149 R |
| 5,983,820 | A * | 11/1999 | Whitley ................ | B63B 21/045 114/218 |
| 6,009,824 | A * | 1/2000 | Ross ..................... | B63B 21/045 114/200 |
| 9,376,171 | B1 * | 6/2016 | Bagwell .................. | B63B 21/04 |
| 2003/0038218 | A1 * | 2/2003 | Eppard ............... | F16M 11/2092 248/219.2 |
| 2020/0389006 | A1 * | 12/2020 | Smith .................... | H02G 7/056 |
| 2022/0200258 | A1 * | 6/2022 | Malin .................... | H02G 7/053 |

* cited by examiner

*Primary Examiner* — Christopher Garft
(74) *Attorney, Agent, or Firm* — Cooper Legal Group, LLC

(57) ABSTRACT

A bracket for suspending multiple line segments at an elevated location is disclosed. The bracket has a back portion to engage against a supporting surface at the elevated location. The back portion has a left segment and a right segment. The bracket has at least one of a left arm extending from the left segment or a right arm extending from the right segment. The bracket has at least one of a first left seat extending from the left arm, a second left seat extending from the left arm, a first right seat extending from the right arm, or a second right seat extending from the right arm. At least one of the multiple line segments are supported by at least one of the first left seat, the second left seat, the first right seat, or the second right seat.

15 Claims, 15 Drawing Sheets

MULTI-LINE SUSPENDING BRACKET

TECHNICAL FIELD

The present disclosure is directed towards supporting multiple suspended lines, such as under various tension and/or various load directions.

BACKGROUND

Many lines, such as communication lines, are located to be suspended (e.g., overhead lines). Such line suspension includes the use of supports. Also, such line suspension includes both pass-through support locations and line drops (e.g., toward terminus/use locations) from supports.

Supports may include brackets that are attached to poles (e.g., utility poles), buildings and other structures. It is possible that the structures (e.g., utility poles) to which the brackets are attached for line suspension may not be owned by the owner of the lines being attached to such structures. It is possible that leasing, rental or the like (e.g., cost) for the right to attach brackets for line suspension is needed. Costs may vary for several reasons, possibly including number of brackets that are attached, the number of attachments (e.g., fasteners) to/into such structures, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with one or more aspects, the present disclosure provides a bracket for suspending multiple line segments at an elevated location. The bracket includes a back portion to engage against a supporting surface at the elevated location. The back portion is configured to permit a single fastener to penetrate the supporting surface and retain the bracket at the elevated location. The back portion having a left segment and a right segment. The bracket includes a left arm extending from the left segment of the back portion. The left arm terminates at a distal end segment. The bracket includes a right arm extending from the right segment of the back portion. The right arm terminates at a distal end segment. The bracket includes a first left seat and a second left seat extending from the distal end segment of the left arm. Each of the left seats is capable to receive a respective line hanging appliance such that the respective line hanging appliance rests within the respective seat and extends to engage and hold a respective one of the multiple line segments. The bracket includes a first right seat and a second right seat extending from the distal end segment of the right arm. Each of the right seats is capable to receive a respective line hanging appliance such that the respective line hanging appliance rests within the respective seat and extends to engage and hold a respective one of the multiple line segments.

In accordance with one or more aspects, the present disclosure provides a bracket for suspending multiple line segments at an elevated location. The bracket includes a back portion to engage against a supporting surface at the elevated location. The back portion has a left segment and a right segment. The back portion has a span extending between the left segment and the right segment. The bracket includes a left arm extending in an outward direction from the left segment of the back portion. The left arm extends away from the back portion at an acute angle relative to the span of the back portion adjacent to the left segment. The left arm terminates at a distal end segment. The bracket includes a right arm extending in an outward direction from the right segment of the back portion. The right arm extends away from the back portion at an acute angle relative to the span of the back portion adjacent to the right segment. The right arm terminates at a distal end segment. The bracket includes a first left seat and a second left seat extending from the distal end segment of the left arm. Each of the left seats is capable to receive a respective line hanging appliance such that the respective line hanging appliance rests within the respective seat and extends to engage and hold a respective one of the multiple line segments. The bracket includes a first right seat and a second right seat extending from the distal end segment of the right arm. Each of the right seats is capable to receive a respective line hanging appliance such that the respective line hanging appliance rests within the respective seat and extends to engage and hold a respective one of the multiple line segments.

In accordance with one or more aspects, the present disclosure provides a bracket for suspending multiple line segments at an elevated location. The bracket includes a back portion to engage against a supporting surface at the elevated location. The back portion has a left segment and a right segment, and has a span extending between the left segment and the right segment. The bracket includes at least one of a left arm or a right arm. The left arm extends in an outward direction from the left segment of the back portion. The left arm extends away from the back portion at an acute angle relative to the span of the back portion adjacent to the left segment. The left arm terminates at a distal end segment. The right arm extends in an outward direction from the right segment of the back portion. The right arm extends away from the back portion at an acute angle relative to the span of the back portion adjacent to the right segment. The right arm terminates at a distal end segment. The bracket includes at least one of a first left seat, a second left seat, a first right seat, or a second right seat. The first left seat extends from the distal end segment of the left arm. The first left seat receives at least one line hanging appliance such that the at least one line hanging appliance rests within the respective seat and extends to engage and hold at least one of the multiple line segments. The second left seat extends from the distal end segment of the left arm. The second left seat receives at least one line hanging appliance such that the at least one line hanging appliance rests within the respective seat and extends to engage and hold at least one of the multiple line segments. The first right seat extends from the distal end segment of the right arm. The first right seat receives at least one line hanging appliance such that the at least one line hanging appliance rests within the respective seat and extends to engage and hold at least one of the multiple line segments. The second right seat extends from the distal end segment of the right arm. The second right seat receives at least one line hanging appliance such that the at least one line hanging appliance rests within the respective seat and extends to engage and hold at least one of the multiple line segments.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
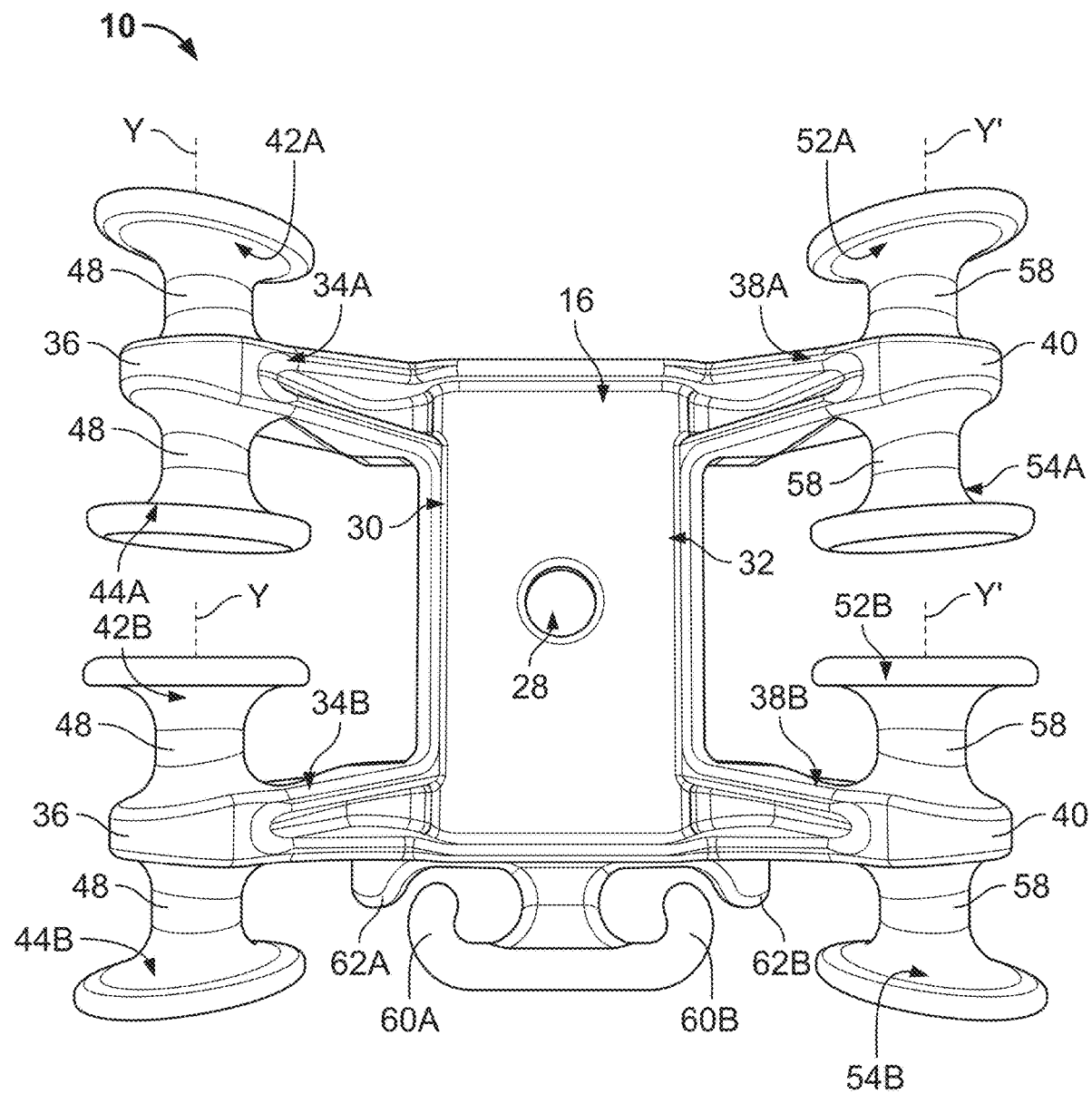
FIG. 1 is a front, plan view picture of a first example of a multi-line suspending bracket according to some embodiments.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

It is to be appreciate that, in one or more examples, the present disclosure provides a bracket for suspending multiple line segments at a single elevated location. The bracket includes a back portion to engage against a supporting surface at the elevated location. The back portion is configured to permit a single fastener to penetrate the supporting surface and retain the bracket at the elevated location. The back portion having a left segment and a right segment. The bracket includes a left arm extending from the left segment of the back portion. The left arm terminates at a distal end segment. The bracket includes a right arm extending from the right segment of the back portion. The right arm terminates at a distal end segment. The bracket includes first and second left seats extending from the distal end segment of the left arm. Each of the left seats has a middle waist segment. The first left seat is located above the distal end segment of the left arm. The second left seat is located below the distal end segment of the left arm. Each of the left seats is capable to receive a respective line hanging appliance such that the respective line hanging appliance rests within the respective middle waist segment and extends to engage and hold a respective one of the line segments. The bracket includes first and second right seats extending from the distal end segment of the right arm. Each of the right seats has a middle waist segment. The first right seat is located above the distal end segment of the right arm. The second right seat is located below the distal end segment of the right arm. Each of the right seats is capable to receive a respective line hanging appliance such that the respective line hanging appliance rests within the respective middle waist segment and extends to engage and hold a respective one of the line segments.

Also it is to be appreciate that, in one or more examples, the present disclosure provides a bracket for suspending multiple line segments at a single elevated location. The bracket includes a back portion to engage against a supporting surface at the elevated location. The back portion has a left segment and a right segment. The back portion has a span extending between the left segment and the right segment. The bracket includes a left arm extending in an outboard direction from the left segment of the back portion. The left arm extends away from the back portion at an acute angle relative to the span of the back portion adjacent to the left segment. The left arm terminates at a distal end segment. The bracket includes a right arm extending in an outboard direction from the right segment of the back portion. The right arm extends away from the back portion at an acute angle relative to the span of the back portion adjacent to the right segment. The right arm terminates at a distal end segment. The bracket includes first and second left seats extending from the distal end segment of the left arm. Each of the left seats has a middle waist segment. The first left seat is located above the distal end segment of the left arm. The second left seat is located below the distal end segment of the left arm. Each of the left seats is capable to receive a respective line hanging appliance such that the respective line hanging appliance rests within the respective middle waist segment and extends to engage and hold a respective one of the line segments. The bracket includes first and second right seats extending from the distal end segment of the right arm. Each of the right seats has a middle waist segment. The first right seat is located above the distal end segment of the right arm. The second right seat is located below the distal end segment of the right arm. Each of the right seats is capable to receive a respective line hanging appliance such that the respective line hanging appliance rests within the respective middle waist segment and extends to engage and hold a respective one of the line segments.

Referring to FIGS. 1-5, an example of a bracket 10 for suspending multiple line segments at a single elevated location is shown. As such, the bracket 10 supports the multiple line segments at the single elevated location. It is to be appreciated that the line segments are of one or more lines. Such lines may communication lines, such as fiber optic bundle lines. However, the lines may be of any type, configuration, etc. As such, specifics of such lines, and line segments thereof, need not be specific limitations upon the present disclosure. Also, it is to be appreciated that the line suspension may include both pass-through (e.g., from one location to a next location in a sequence) support locations and/or line drops (e.g., toward terminus/use locations) from respective supports.

It is to be appreciated that the elevated location at which the bracket 10 suspends the lines may be varied. For example, the elevated location may be at a pole (e.g., a utility pole), a building or other structures. The bracket 10 is attached to the structure (e.g., a utility pole) to provide the line suspension at the elevated location. See FIG. 6 for an example of a utility pole 12 (only a quarter section of the pole is shown), which is an example structure 12, and the example bracket 10 attached thereto.

It is possible that the structure (e.g., a utility pole) to which the bracket 10 is attached for line suspension may not be owned by the owner of the line(s) being suspended relative to such structure. It is possible that leasing, rental or the like (e.g., cost-incurring activity) for the right to attach brackets for line suspension is needed. Costs may vary for any of several reasons, possibly including number of bracket (s) that are attached, the number of attachment(s) (e.g., fastener(s)) to/into such structure(s), etc. So, in accordance with some aspects of the present disclosure, the bracket has some structure(s) that may help alleviate/mitigate such an issue.

The bracket 10 (see FIGS. 2-5) includes a back portion 16 for engagement against a supporting surface 18 (see FIG. 6) of the structure 12 (e.g., utility pole 12) at the elevated location. Within the shown example, the back portion 16 is generally a rectangular shaped portion as view from the front (see FIG. 1). Of course, may other shapes are possible, contemplated and within the scope of the present disclosure. Also, there may be many ancillary structures, features, etc., all of such are possible, contemplated and within the scope of the present disclosure.

Figure 6:
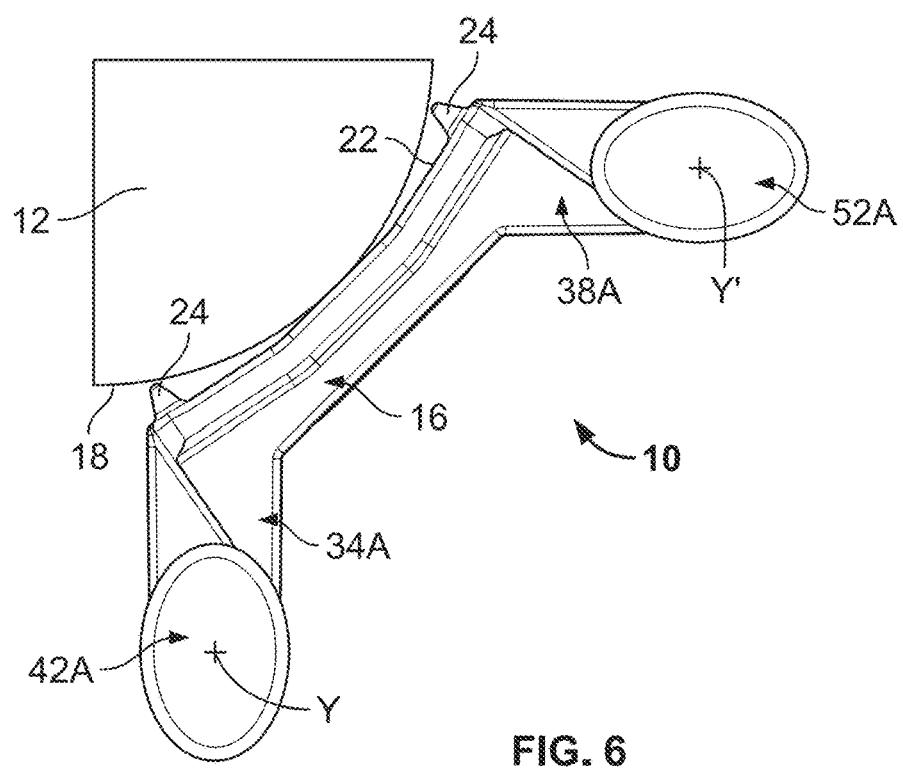
FIG. 6 is top view illustration of the example bracket of FIG. 1 and an example structure to which the example bracket is engaged and secured, according to some embodiments.

Within the example show within FIG. 6, the back portion 16 engages against the outer surface 18 of the utility pole 12. Thus, the outer surface 18 of the utility pole 12 is an example of a supporting surface 18. Another way of stating such is that the example supporting surface 18 at the elevated location is the outer surface 18 of the utility pole 12. Of course, the supporting surface 18 can be varied and will depend upon the structure associated with a particular elevated location.

Within the mentioned example of the utility pole 12, it is to be appreciated that the utility pole has a general cylindrical shape (e.g., the outer surface 18 is convexly curved about a major elongation axis of the utility pole 12). Again, it is to be appreciated that FIG. 6 only shows a quarter section of the pole 12.

As an example, the back portion 16 of the show example bracket 10 has a general cylindrical concave face 22 (see FIGS. 2, 3 and 6) to generally mate against the outer surface of the utility pole 12. Of course, the presence of a contour (e.g., cylindrical concave) on the back portion 16 is only an example and that variations are possible, contemplated and within the scope of the present disclosure.

Within an example, the utility pole 12 (FIG. 6) may be wooden. As such, the shown example bracket 10 may include one or more spikes 24 (FIGS. 2, 3 and 6) or other contouring on the back portion 16 for engaging/gripping the wood of the utility pole 12. Within the shown example, four spikes 24 are provided. Of course, the presence, number, etc. of the spikes 24, and/or other contouring, is optional. Also, the specifics of such spikes/contouring may be varied and such variation is within the scope of the present disclosure.

Within the shown example, the back portion 16 includes a single through-hole 28 (FIGS. 1-5). A fastener, such as a lag bolt, may extend through the through-hole 28 and into the utility pole 12, or other structure as the case may be based upon the selected elevated location for the bracket 10. The fastener may attach the bracket 10 to the utility pole 12 or other structure via penetration into the utility pole or other structure. Of course, it is to be appreciated that more than one through-hole and/or other attachment structures may be provided. However, it is to be noted that a single through-hole 28 is associated with use of a single fastener (e.g., a lag bolt). As such, a single fastener may be used to attach the entire bracket 10, including all of the structures that are described following. Such may provide useful benefit, such as minimizing fastener penetration(s) into the utility pole 12. As such, the back portion 16, with the through-hole 28, may be configured to permit a single fastener to penetrate the supporting surface 18 and retain the bracket 10 at the elevated location.

It is to be appreciated that the back portion 16 may also be configured to be attached via use of an arrangement other than use of a perpetrating fastener. As an example, note that the shape (e.g., rectangular, see FIGS. 1, 3 and 5) of the back portion 16 is such that one or more strap bands may be placed on/against the back portion and extend to encircle the supporting structure (e.g., a wood utility pole, a metal utility pole, a portion of some other structure such as a building). As such, attachment options are provided by the example bracket 10.

Figure 2:
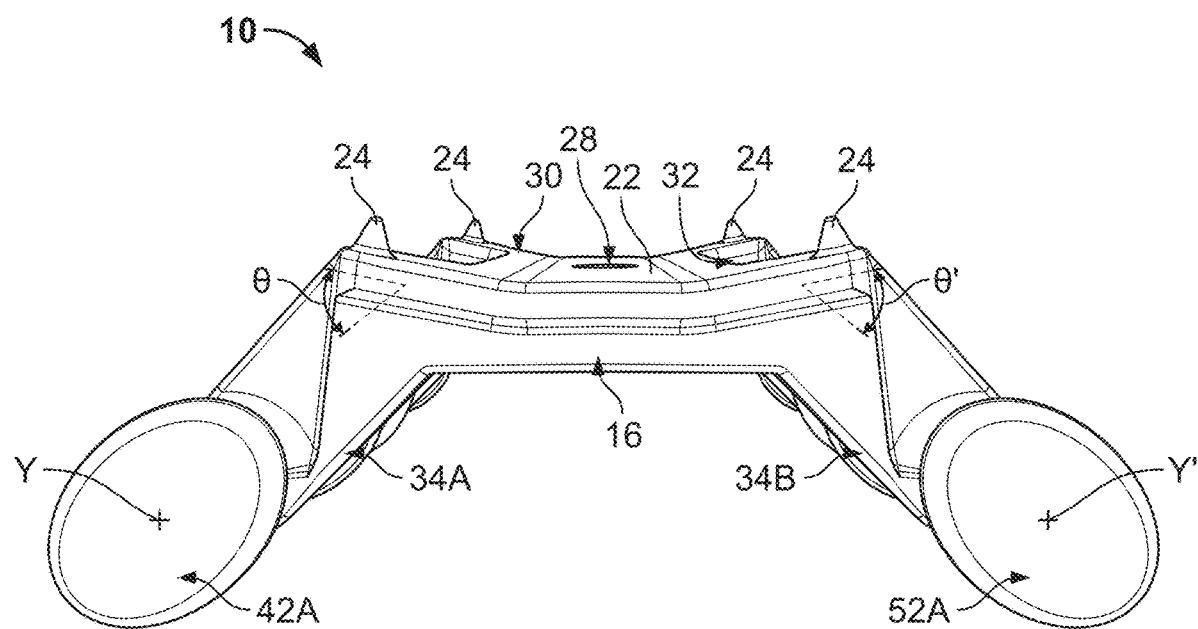
FIG. 2 is a top view picture of the example bracket of FIG. 1, according to some embodiments.
Figure 3:
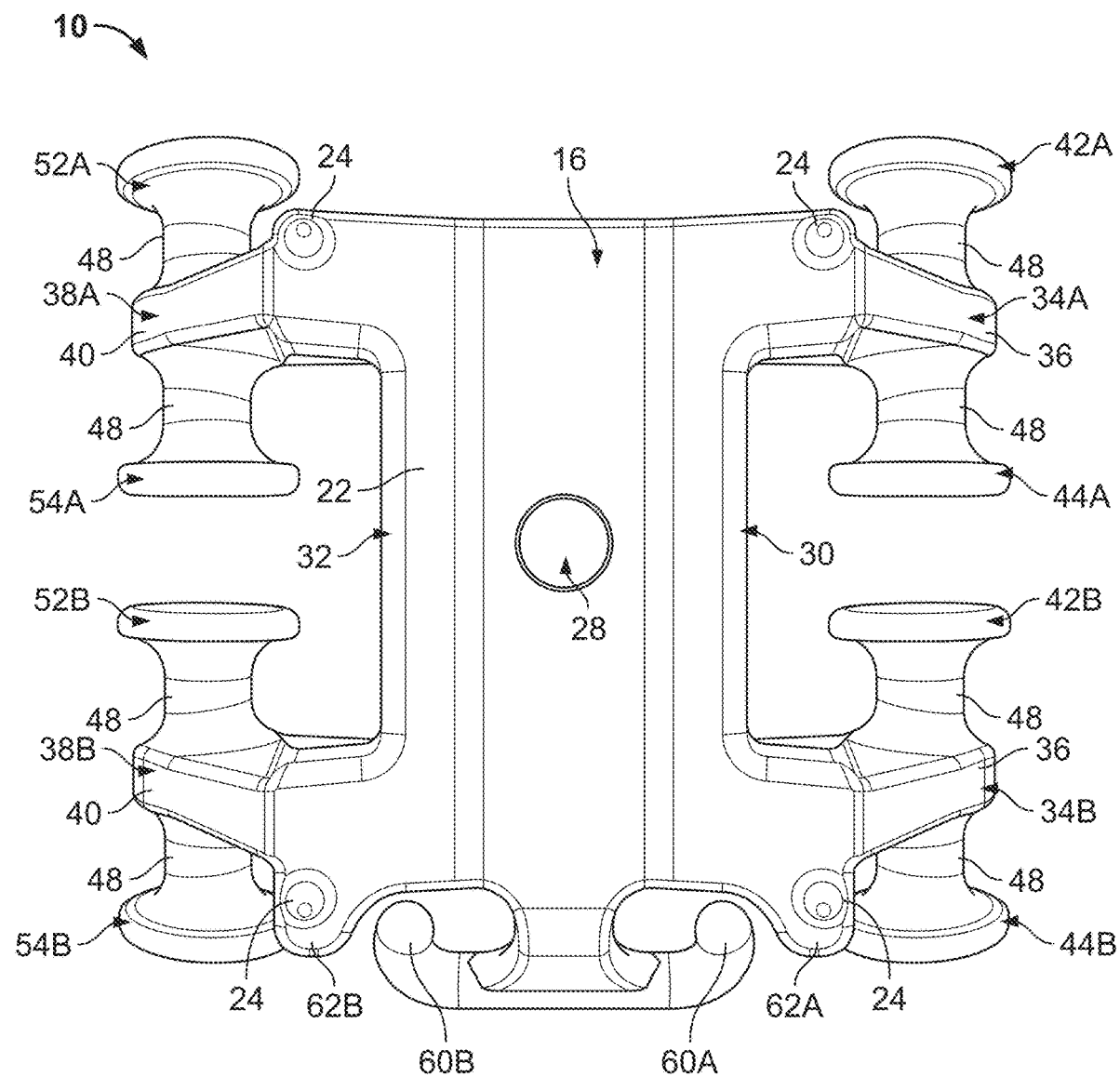
FIG. 3 is a rear view picture of the example bracket of FIG. 1, according to some embodiments.
Figure 4:
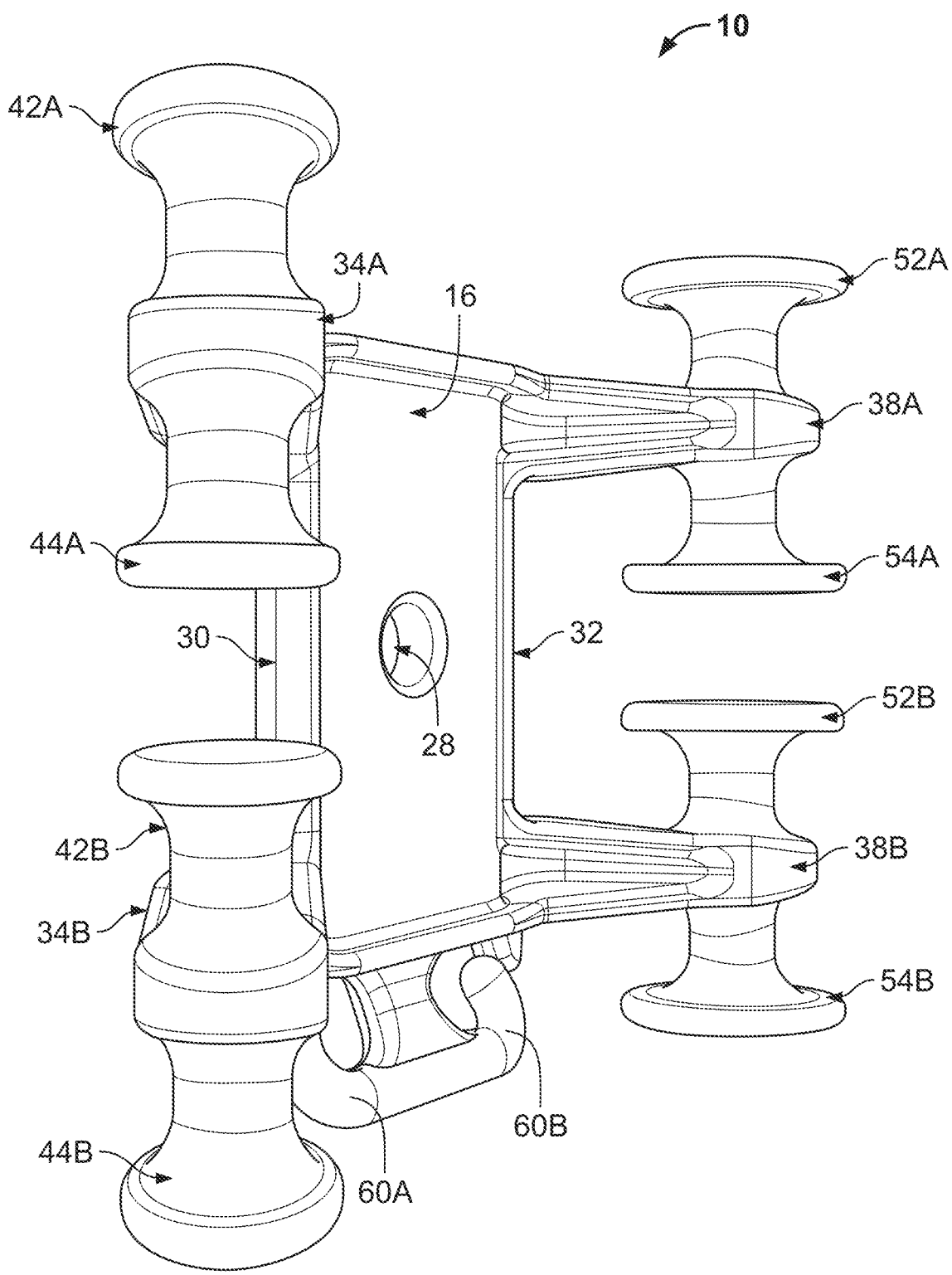
FIG. 4 is a left perspective view picture of the example bracket of FIG. 1, according to some embodiments.
Figure 5:
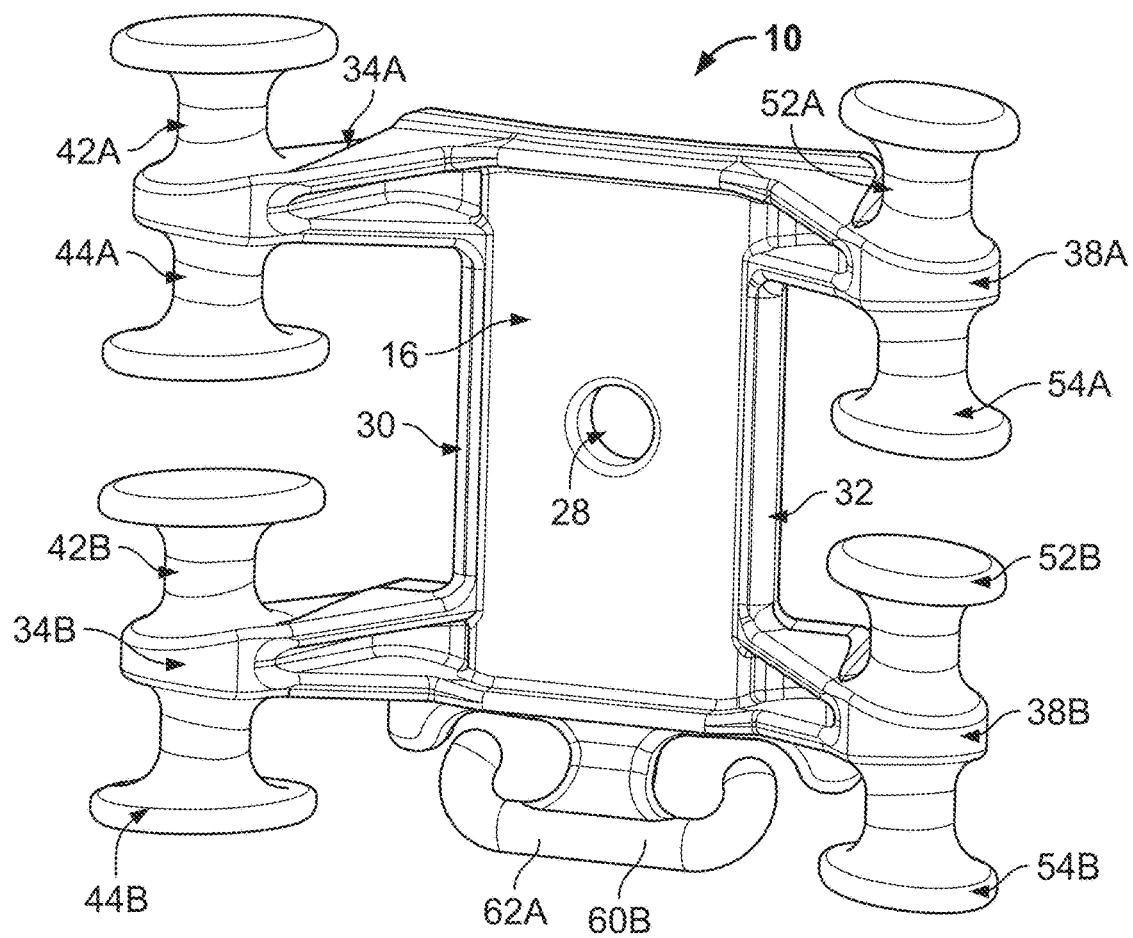
FIG. 5 is a right perspective view illustration of the example bracket of FIG. 1, according to some embodiments.

As a pragmatic matter, the back portion 16 has a left segment 30 and a right segment 32, as viewed within FIGS. 1 and 2. The orientation of such designations and the sizes of such designated segments need not be a limitation upon the present disclosure. However, such designated segments (i.e., a left segment 30 and a right segment 32) simply make reference and discussion easier.

The bracket 10 includes at least one left (as viewed in FIG. 1) arm 34 (e.g., 34A) extending from the left segment 30 of the back portion 16. Each left arm 34 (e.g., 34A) terminates at a distal end segment 36. Within the show example, there are two left arms 34A, 34B. A first left arm 34A extends from an upper, as viewed in FIG. 1, extent of the back portion 16. A second left arm 34B extends from a lower, as viewed in FIG. 1, extent of the back portion 16.

Within the shown example, each respective left arm (i.e., 34A, 34B) extends outboard (i.e., leftward away from center) away from the back portion 16. Also within the shown example, each respective left arm (i.e., 34A, 34B) extends away from the back portion 16 at an acute angle θ (see FIG. 2) relative to the span of the back portion 16 adjacent to the left segment 30. The acute angle θ may be any angle within the range of 1° to 89°. It is to be understood that it is within the scope of the present disclosure that the angle θ may be other than an acute angle (e.g., 90°. Further within the shown example, the first left arm 34A and the second left arm 34B extend from the back portion 16 the same amount (e.g., length) and at the same acute angle θ. However, it is to be understood that it is within the scope of the present disclosure that the first left arm 34A and the second left arm 34B extend from the back portion 16 different amounts (e.g., length) and/or at different angles.

The bracket 10 includes at least one right (as viewed in FIG. 1) arm 38 (e.g., 38A) extending from the right segment 32 of the back portion 16. Each right arm 38 terminates at a distal end segment 40. Within the show example, there are two right arms 38A, 38B. A first right arm 38A extends from an upper, as viewed in FIG. 1, extent of the back portion 16. A second right arm 38B extends from a lower, as viewed in FIG. 1, extent of the back portion 16.

Within the shown example, each respective right arm (i.e., 38A, 38B) extends outboard (i.e., rightward away from center) away from the back portion 16. Also within the shown example, each respective right arm (i.e., 38A, 38B) extends away from the back portion 16 at an acute angle θ' (see FIG. 2) relative to the span of the back portion 16 adjacent to the right segment 32. The acute angle θ may be any angle within the range of 1° to 89°. It is to be understood that it is within the scope of the present disclosure that the angle θ' may be other than an acute angle (e.g., 90°. Further within the shown example, the first right arm 38A and the second right arm 38B extend from the back portion 16 the same amount (e.g., length) and at the same acute angle θ'. However, it is to be understood that it is within the scope of the present disclosure that the first right arm 38A and the second right arm 38B extend from the back portion 16 different amounts (e.g., length) and/or at different angles.

The shown example of the bracket 10 has left arms 34A and 34B and right arms 38A and 38B that extend from the back portion 16 the same amount (e.g., length) and that the angle θ is the same as the angle θ'. However, it is to be understood that it is within the scope of the present disclosure that the various arms (i.e., 34A, 34B, 38A and 38B) may have various combinations of extends (e.g., lengths) and/or various combinations of angles.

The bracket 10 includes respective first and second left (as viewed in FIG. 1) seats 42, 44 that extend from the distal end segment 36 of each respective left arm 34. As such, first and second left seats 42A, 44A extend from the first left arm 34A. Also, first and second left seats 42B, 44B extend from the second left arm 34B.

It is to be appreciated that at least two left seats are present. The shown example has four left seats 42A, 44A, 42B, 44B. It is to be appreciated that the number of left seats may be varied and that such variation is within the scope of the present disclosure. Within the shown example, each of the seats 42A, 44A, 42B, 44B has a general spool-like, somewhat cylindrical, hourglass-like shape. However, different shapes such as shapes other than spool-like, other than cylindrical, and/or other than hourglass-like are contemplated and within the scope of the present disclosure. Moreover, it is to be appreciated that at least one of the seats 42A, 44A, 42B, 44B is a mounting point as discussed herein. All of the terms, phrases, etc. regarding the seats 42A, 44A, 42B, 44B are to be broadly interpreted. As such, each shown example of a spool-like, cylindrical, hourglass, etc. shaped device which has a rim or ridge at at least one end and/or a narrower, tapered, etc. waist segment is a non-limiting example.

Turning to the shown example, each of the left seats 42A, 44A, 42B, 44B has a respective vertical axis Y. It is to be appreciated within the shown example, the respective vertical axes Y of the left seats 42A, 44A, 42B, 44B are aligned and coaxial. Of course, it is to be appreciated that such positioning of the axes is just an example and that different positionings of the axes are contemplated and within the scope of the present disclosure.

Each of the example left seats 42A, 44A, 42B, 44B has a respective seat 48. Within the shown example, each waist segment 48 is partially defined by tapering, annular concave fillet surface segments. Of course, it is to be appreciated that such surface segments can be varied (e.g., annular chamfers or similar) and that such variation is within the scope of the present disclosure.

Also, within the shown example, seat ends of the left seats 42A, 44A, 42B, 44B are oblong or oval in shape when viewed along the axis Y (i.e., the seat axis, or in the shown example a spool axis). See FIG. 2. So, each of the left seats 42A, 44A, 42B, 44B has a respective oval shape as viewed along a respective seat axis. It is to be appreciated that the seat end shape may be varied (e.g., circular) and/or appendages to the seat end may be added and that such shape variation and/or appendage addition is within the scope of the present disclosure.

As viewed within FIG. 1, each first left seat (i.e., 42A, 42B) is located above the distal end segment 36 of the respective left arm (i.e., 34A, 34B). As viewed within FIG. 1, each second left seat (i.e., 44A, 44B) is located below the distal end segment 36 of the respective left arm (i.e., 34A, 34B). As discussed further following, each of the left seats (i.e., 42A, 44A, 42B and 44B) may receive a respective line hanging appliance (see examples within FIGS. 7 and 8) such that the respective line hanging appliance rests within the respective middle waist segment 48 and extends to engage and hold a respective one of the line segments.

The bracket 10 includes respective first and second right (as viewed in FIG. 1) seats 52, 54 that extend from the distal end segment 40 of each respective right arm 38. As such, first and second right seats 52A, 54A extend from the first right arm 38A. Also, first and second right seats 52B, 54B extend from the second right arm 38B.

It is to be appreciated that at least two right seats are present. The shown example has four right seats 52A, 54A, 52B, 54B. It is to be appreciated that the number of right seats may be varied and that such variation is within the scope of the present disclosure. Within the shown example, each of the seats 52A, 54A, 52B, 54B has a general spool-like, somewhat cylindrical, hourglass-like shape. However, different shapes such as shapes other than spool-like, other than cylindrical, and/or other than hourglass-like are contemplated and within the scope of the present disclosure. Moreover, it is to be appreciated that at least one of the seats 52A, 54A, 52B, 54B is a mounting point as discussed herein. All of the terms, phrases, etc. regarding the seats 52A, 54A, 52B, 54B are to be broadly interpreted. As such, each shown example of a spool-like, cylindrical, hourglass, etc. shaped device which has a rim or ridge at at least one end and/or a narrower, tapered, etc. waist segment is a non-limiting example.

Turning to the shown example, each of the right seats 52A, 54A, 52B, 54B has a respective vertical axis Y'. It is to be appreciated within the shown example, the respective vertical axes Y' of the right seats 52A, 54A, 52B, 54B are aligned and coaxial. Of course, it is to be appreciated that such positioning of the axes is just an example and that different positionings of the axes are contemplated and within the scope of the present disclosure.

Each of the right seats 52A, 54A, 52B, 54B has a respective middle waist segment 58. Within the shown example, each waist segment 58 is partially defined by tapering, annular concave fillet surface segments. Of course, it is to be appreciated that such surface segments can be varied (e.g., annular chamfers or similar) and that such variation is within the scope of the present disclosure.

Also, within the shown example, seat ends of the right seats 52A, 54A, 52B, 54B are oblong or oval in shape when viewed along the axis Y' (i.e., the seat axis, or in the shown example a spool axis). See FIG. 2. So, each of the right seats 52A, 54A, 52B, 54B has a respective oval shape as viewed along a respective seat axis. It is to be appreciated that the seat end shape may be varied (e.g., circular) and/or appendages to the seat end may be added and that such shape variation and/or appendage addition is within the scope of the present disclosure.

As viewed within FIG. 1, each first right seat (i.e., 52A, 52B) is located above the distal end segment 40 of the respective left arm (i.e., 38A, 38B). As viewed within FIG. 1, each second right seat (i.e., 54B, 54B) is located below the distal end segment 40 of the respective right arm (i.e., 38A, 38B). As discussed further following, each of the right seats (i.e., 52A, 54A, 52B and 54B) may receive a respective line hanging appliance (similar to the shown examples within FIGS. 7 and 8) such that the respective line hanging appliance rests within the respective middle waist segment 58 and extends to engage and hold a respective one of the line segments.

The example bracket 10 includes a hook 60 that extends from the back portion 16. Within the shown example, two hooks, 60A, 60B are provided. The two hooks 60A, 60B are a sub-assembly that extends downward (as viewed in FIGS. 1, 3, 4 and 5) from the bottom of the back portion 16. One hook 60A opens toward the left as viewed in FIGS. 1, 4 and 5, and the other hook 60B opens toward the right. Each hook 60A, 60B is for receiving a respective line hanging appliance (generally, similar to the shown examples within FIGS. 7 and 8) such that the respective line hanging appliance rests within the hook and extends to engage and hold a respective one of the line segments.

Within the shown examples, a blocking protrusion 62A, 62B is associated with each respective hook 60A, 60B, near the respective open end of the respective hook. The blocking protrusion 62A, 62B extend downward (as viewed in FIGS. 1, 3, 4 and 5) from the back portion 16. The blocking protrusion 62A, 62B provide at least some impediment against removal of a respective line hanging appliance from the respective hook 60A, 60B.

Figure 7:
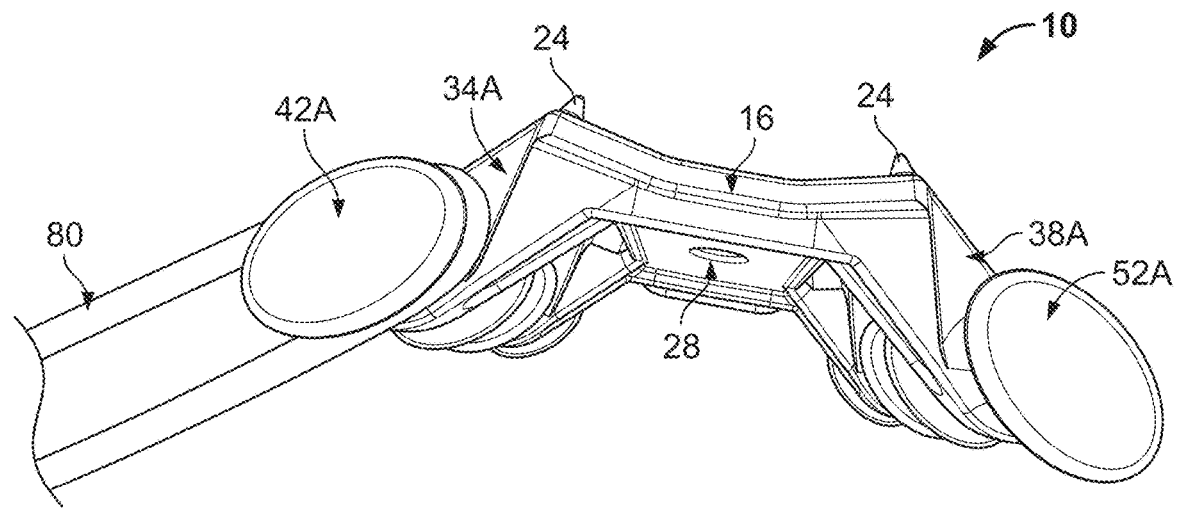
FIG. 7 is a top view picture of the example bracket of FIG. 1 and a first example line hanging appliance received upon a portion of the bracket, according to some embodiments. It is to be appreciated that one or more line hanging appliances may be received within a same portion, with the understanding that a maximum load rating is not exceeded.
Figure 8:
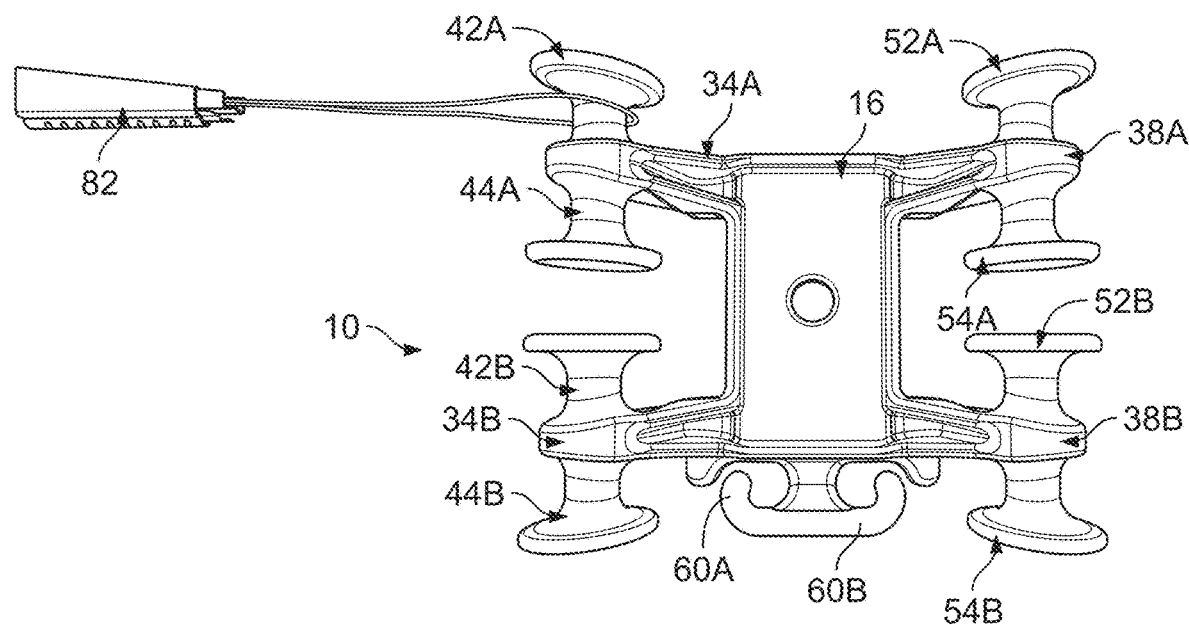
FIG. 8 is a front, plan view picture of the example bracket of FIG. 1 and a second example line hanging appliance received upon a portion of the bracket, according to some embodiments. It is to be appreciated that one or more line hanging appliances may be received within a same portion, with the understanding that a maximum load rating is not exceeded.

As mentioned, the seats 42A, 44A, 42B, 44B, 52A, 54A, 52B, 54B and the hooks 60A, 60B are for receiving a respective line hanging appliance such that the respective line hanging appliance rests within the hook and extends to engage and hold a respective one of the line segments. FIGS. 7 and 8 show examples of such line hanging appliances. Specifically, FIG. 7 shows an example of a formed-wire dead-end 80 and FIG. 8 shows an example P-clamp/wedge-type dead end 82. It is to be appreciated that other types of line hanging appliances may be utilized and that such other line hanging appliances are thus within the scope of the present disclosure. Each of such line hanging appliances has its own respective manner of engaging/interacting with lines. Also, it is to be appreciated that one or more line hanging appliances may be received (e.g., attached) within a same seat (e.g., any of the shown seats), with the understanding that a maximum load rating is not exceeded. The specifics of the line hanging appliances engaging/interacting with lines need not be specific limitations upon the present disclosure.

It is to be appreciated that the seats 42A, 44A, 42B, 44B, 52A, 54A, 52B, 54B may readily accommodate use for pass-through (e.g., transit) support. For example, each pair of seats (e.g., 42A and 52A, 44A and 54A, 42A and 52B, and 44B and 54B) that are at the same height along the bracket 10 may easily be utilized with a pair of line hanging appliances for a line that passes-through/transits past the bracket 10. Each seat of the pair of seats (e.g., 42A and 52A) supports a respective line segment of the line that passes-through/transits past the bracket 10.

Attention is directed to FIG. 6, to again note that the arms 34A, 38A, 34B and 38B extend from the back portion 16. Also, again note that the arms 34A, 38A, 34B and 38B extends outboard (i.e., leftward or rightward away from center) away from the back portion 16. Still further, again note that the arms 34A, 38A, 34B and 38B extend away from the back portion 16 at respective acute angles θ (see FIG. 2). With the extending (e.g., outboard and/or at an angle away from the back portion 16) of the arms 34A, 38A, 34B and 38B, lines that pass-through or transit may be provided with support location point(s) that are well away from the pole 12.

Moreover, if the line that is passing-through/transiting is turning at the bracket 10, the bracket allows the overall turn angle to be bifurcated and distributed between the two points (e.g., a pair of seats such as 42A and 52A, 44A and 54A, 42B and 52B, or 44B and 54B). As such, the angle of redirection at each support point is relatively lessened. As an example, consider a line that would enter from the left in FIG. 6 and exits upward, to the top in FIG. 6. The overall amount of direction change may be considered to be 90°. However, within the use of the bracket 10, a first portion (e.g., a portion of the overall 90°) of direction change can be associated within the seat 42A and a second portion (e.g., a remaining portion of the overall 90°) of direction change can be associated within the seat 52A. Such may help alleviate relatively sharp direction changes for lines. Some lines (e.g., some fiber optic lines) may be damaged by sharp direction changes. The bracket 10 may help alleviate such. Also, it is to be appreciated that using an appropriate line hanging appliance may help alleviate tension and/or relatively sharp direction changes for lines.

It is to be appreciated that the example bracket 10 shown in FIGS. 1-8 provides ten locations for receiving respective line hanging appliances. Specifically, the seats 42A, 44A, 42B, 44B, 52A, 54A, 52B, 54B provide eight locations for receiving respective line hanging appliances and the hooks 60A, 60B provide two locations for receiving respective line hanging appliances. It is to be appreciated that one or more line hanging appliances may be placed (e.g., hung) from any one seat, such as depending on a line hanging appliance design and/or a tension rating. Of course, it is to be appreciated that all of the possible locations for receiving respective line hanging appliances need not be used.

It is to be appreciated that the number of locations for receiving respective line hanging appliances and/or other aspects of a bracket may be varied within the scope of the present disclosure. Following are discussed some other example brackets that have various variations. It is to be appreciated that the variations discussed and shown need not be limitations upon the present disclosure and that other variations are contemplated and within the scope of the present disclosure.

Figure 9:
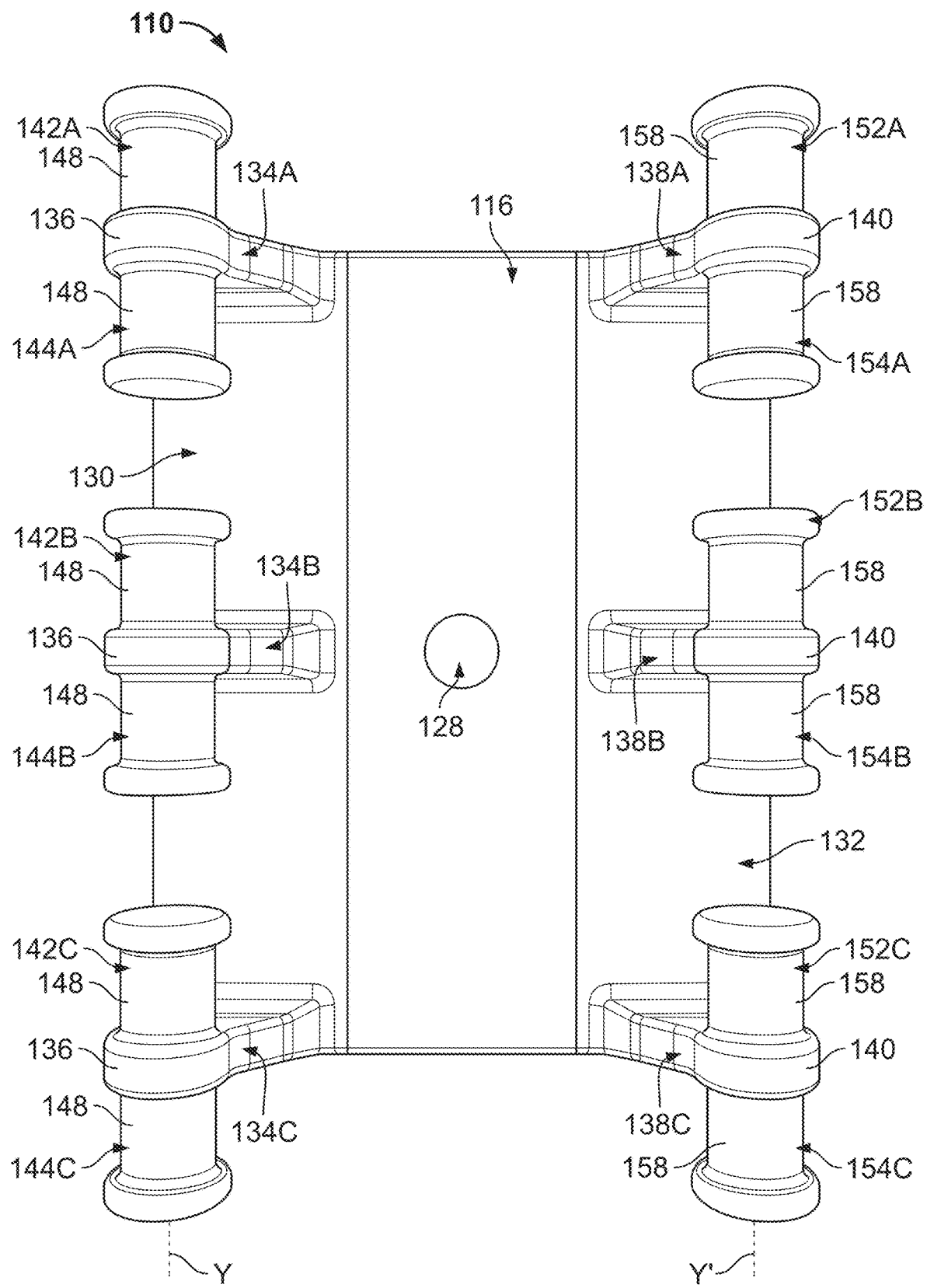
FIG. 9 is a front, plan view picture of a second example of a multi-line suspending bracket according to some embodiments.
Figure 10:
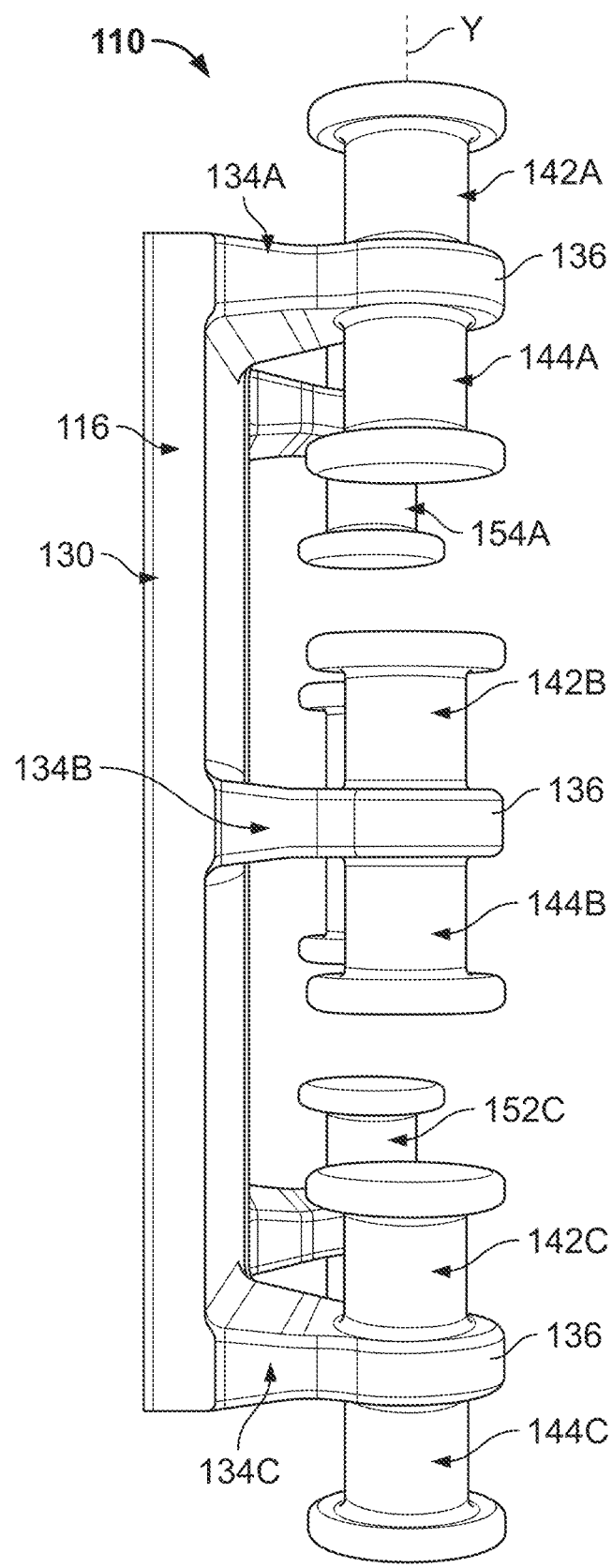
FIG. 10 is a left perspective view picture of the example bracket of FIG. 9, according to some embodiments.
Figure 11:
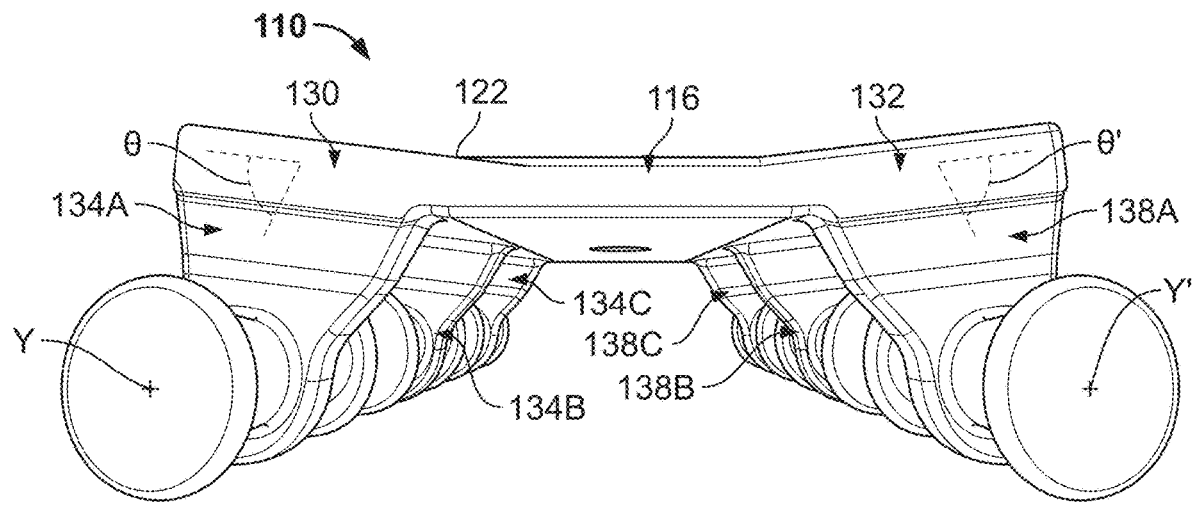
FIG. 11 is a top view picture of the example bracket of FIG. 9, according to some embodiments.

Another example bracket 110 is shown within FIGS. 9-11. The bracket 110 is for suspending multiple line segments at a single elevated location. As such the bracket 110 supports the multiple line segments at the single elevated location. It is to be appreciated that the line segments are of one or more lines. Such lines may communication lines, such as fiber optic bundle lines. However, the lines may be of any type, configuration, etc. As such, specifics of such lines need not be specific limitation upon the present disclosure. Also, it is to be appreciated that the line suspension includes both pass-through support locations (e.g., from one location to a next location in a sequence) and line drops (e.g., toward terminus/use locations) from supports.

It is to be appreciated that the elevated location at which the bracket 110 suspends the lines may be varied. For example, the elevated location may be at a pole (e.g., a utility pole), a building or other structures. The bracket 110 is attached to the structure (e.g., a utility pole) to provide the line suspension at the elevated location.

It is possible that the structure (e.g., a utility pole) to which the bracket 110 is attached for line suspension may not be owned by the owner of the lines being attached to such structures. It is possible that leasing, rental or the like (e.g., cost) for the right to attach brackets for line suspension is needed. Costs may vary for several reasons, possibly including number of brackets that are attached, the number of attachments (e.g., fasteners) to/into such structures. So, in accordance with some aspects of the present disclosure, the bracket has some structure(s) that may help alleviate such an issue.

The bracket 110 incudes a back portion 116 for engagement against a supporting surface at the elevated location. Within the shown example, the back portion 116 is generally a rectangular shaped portion as view from the front (see FIG. 9). Of course, may other shapes are possible, contemplated and within the scope of the present disclosure. Also, there may be many ancillary structures, features, etc., all of such are possible, contemplated and within the scope of the present disclosure.

The back portion engages against an outer, supporting surface of the support structure (e.g., a utility pole or similar). Of course, the supporting surface can be varied and will depend upon the structure associated with a particular elevated location.

As an example, the back portion 116 of the show example bracket 10 has a general cylindrical concave face 122 (see FIG. 11) to generally mate against the outer surface of a utility pole or similar. Of course, the presence of a contour (e.g., cylindrical concave) on the back portion 116 is only an example and that variations are possible, contemplated and within the scope of the present disclosure.

Within the shown example, the back portion 116 includes a single through-hole 128 (FIG. 9). A fastener, such as a lag bolt, may extend through the through-hole 128 and into a utility pole, or other structure as the case may be, based upon the selected elevated location for the bracket 110. The fastener may attach the bracket 110 to the utility pole or other structure via penetration into the utility pole or other structure. Of course, it is to be appreciated that more than one through-hole and/or other attachment structures may be provided. However, it is to be noted that a single through-hole 128 is associated with use of a single fastener (e.g., a lag bolt). As such, a single fastener may be used to attach the entire bracket 110, including all of the structures that are described following. Such may provide useful benefit; such as minimizing fastener penetration into a utility pole. As such, the back portion 116, with the through-hole 128, may be configured to permit a single fastener to penetrate a supporting surface and retain the bracket 110 at the elevated location.

It is to be appreciated that the back portion 116 may also be configured to be attached via use of an arrangement other than use of a perpetrating fastener. As an example, note that the shape (e.g., rectangular, see FIG. 9) of the back portion 116 is such that one or more strap bands may be placed on/against the back portion and extend to encircle the supporting structure (e.g., a wood utility pole, a metal utility pole, a portion of some other structure such as a building). As such, attachment options are provided by the example bracket 110.

As a pragmatic matter, the back portion 116 has a left segment 130 and a right segment 132, as viewed within FIG. 9. The orientation of such designations and the sizes of such designated segments need not be a limitation upon the present disclosure. However, such designated segments (i.e., a left segment 130 and a right segment 132) simply make reference and discussion easier.

The bracket 110 includes at least one left (as viewed in FIG. 9) arm 134 extending from the left segment 130 of the back portion 116. Each left arm 134 terminates at a distal end segment 136. Within the show example, there are three left arms 134A, 134B and 134C. A first left arm 134A extends from an upper, as viewed in FIG. 9, extent of the back portion 116. A second left arm 134B extends from a middle, as viewed in FIG. 9, area of the back portion 116. A third left arm 134C extends from a lower, as viewed in FIG. 9, extent of the back portion 116.

Within the shown example, each respective left arm (i.e., 134A, 134B, 134C) extends away from the back portion 16. The direction of extent may be at an angle $\theta$ (see FIG. 11) relative to the span of the back portion 16 adjacent to the left segment 130. Moreover, the angle $\theta$ may be an acute angle relative to the span of the back portion 116 adjacent to the left segment 130. If the angle $\theta$ is an acute angle, such may be any angle within the range of 1° to 89°. It is to be understood that it is within the scope of the present disclosure that the angle $\theta$ may be other than an acute angle (e.g., 90°. Further within the shown example, the three left arms 134A, 134B, 134C extend from the back portion 16 the same amount (e.g., length) and at the same angle $\theta$. However, it is to be understood that it is within the scope of the present disclosure that the three arms 134A, 134B, 134C may extend from the back portion 116 different amounts (e.g., length) and/or at different angles.

The bracket 110 includes at least one right (as viewed in FIG. 9) arm 138 extending from the right segment 132 of the back portion 116. Each right arm 138 terminates at a distal end segment 140. Within the show example, there are three right arms 138A, 138B and 138C. A first right arm 138A extends from an upper, as viewed in FIG. 9, extent of the back portion 16. A second right arm 138B extends from a middle, as viewed in FIG. 1, area of the back portion 16. A third right arm 138C extends from a lower, as viewed in FIG. 9, extent of the back portion 116.

Within the shown example, each respective right arm (i.e., 138A, 138B, 138C) extends away from the back portion 116 at an acute angle $\theta'$ (see FIG. 11) relative to the span of the back portion adjacent to the right segment 132. The acute angle $\theta'$ may be any angle within the range of 1° to 89°. It is to be understood that it is within the scope of the present disclosure that the angle $\theta'$ may be other than an acute angle (e.g., 90°. Further within the shown example, the three right arms 138A, 138B, 138C extend from the back portion 116 the same amount (e.g., length) and at the same acute angle θ'. However, it is to be understood that it is within the scope of the present disclosure that the three right arms 138A, 138B, 138C may extend from the back portion 116 different amounts (e.g., length) and/or at different angles.

The shown example of the bracket 10 has the three left arms 134A 134B, 134C and three right arms 138A, 138B, 138C extending from the back portion 116 the same amount (e.g., length) and that the angle θ is the same as the angle θ'. However, it is to be understood that it is within the scope of the present disclosure that the various arms (i.e., 134A, 134B, 134C, 138A 138B, 138C) may have various combinations of extends (e.g., lengths) and/or various combinations of angles.

The bracket 110 includes respective first and second left (as viewed in FIG. 9) seats 142, 144 that extend from the distal end segment 136 of each respective left arm 134. As such, first and second left seats 142A, 144A extend from the first left arm 134A. Also, first and second left seats 142B, 144B extend from the second left arm 134B. Further, first and second left seats 142C, 144C extend from the third left arm 134C.

It is to be appreciated that at least two left seats are present. The shown example has six left seats 142A, 144A, 142B, 144B, 142C, 144C. It is to be appreciated that the number of left seats may be varied and that such variation is within the scope of the present disclosure. Within the shown example, each of the seats 142A, 144A, 142B, 144B, 142C, 144C has a general spool-like, somewhat cylindrical shape. However, different shapes such as shapes other than spool-like, other than cylindrical, etc. are contemplated and within the scope of the present disclosure. Moreover, it is to be appreciated that at least one of the seats 142A, 144A, 142B, 144B, 142C, 144C is a mounting point as discussed herein. All of the terms, phrases, etc. regarding the seats 142A, 144A, 142B, 144B, 142C, 144C are to be broadly interpreted. As such, each shown example of a spool-like, cylindrical, etc. shaped device which has a rim or ridge at at least one end and/or a narrower, tapered, etc. waist segment is a non-limiting example.

Turning to the shown example, each of the left seats 142A, 144A, 142B, 144B, 142C, 144C has a respective vertical axis Y. It is to be appreciated within the shown example, the respective vertical axes Y of the left seats 142A, 144A, 142B, 144B, 142C, 144C are aligned and coaxial. Of course, it is to be appreciated that such positioning of the axes is just an example and that different positionings of the axes are contemplated and within the scope of the present disclosure.

Each of the left seats 142A, 144A, 142B, 144B, 142C, 144C has a respective middle waist segment 148. Within the shown example, each waist segment 148 has a general cylindrical shape. Of course, it is to be appreciated that each waist segment 148 can be varied (e.g., annular tapering, annular chamfers or similar) and that such variation is within the scope of the present disclosure.

Also, within the shown example, seat ends of the left seats 142A, 144A, 142B, 144B, 142C, 144C are oblong or oval in shape when viewed along the axis Y (e.g., the seat axis, or in the shown example a spool axis). See FIG. 11. So, each of the left seats 142A, 144A, 142B, 144B, 142C, 144C has a respective oval shape as viewed along a respective seat axis. It is to be appreciated that the seat end shape may be varied (e.g., circular) and/or appendages to the seat end may be added and that such shape variation and/or appendage addition is within the scope of the present disclosure.

As viewed within FIG. 9, each first left seat (i.e., 142A, 142B, 142C) is located above the distal end segment 136 of the respective left arm (i.e., 134A, 134B, 134C). As viewed within FIG. 9, each second left seat (i.e., 144A, 144B, 144C) is located below the distal end segment 136 of the respective left arm (i.e., 134A, 134B, 134C). As discussed further following, each of the left seats (i.e., 142A, 144A, 142B, 144B, 142C, 144C) is to receive a respective line hanging appliance (see examples within FIGS. 7 and 8) such that the respective line hanging appliance rests within the respective middle waist segment 148 and extends to engage and hold a respective one of the line segments.

The bracket 110 includes respective first and second right (as viewed in FIG. 9) seats 152, 154 that extend from the distal end segment 140 of each respective right arm 138. As such, first and second right seats 152A, 154A extend from the first right arm 138A. Also, first and second right seats 152B, 154B extend from the second right arm 138B. Further, first and second right seats 152C, 154C extend from the third right arm 138C.

It is to be appreciated that at least two right seats are present. The shown example has six right seats 152A, 154A, 152B, 154B, 152C, 154C. It is to be appreciated that the number of right seats may be varied and that such variation is within the scope of the present disclosure. Within the shown example, each of the seats 152A, 154A, 152B, 154B, 152C, 154C has a general spool-like, somewhat cylindrical shape. However, different shapes such as shapes other than spool-like, other than cylindrical, etc. are contemplated and within the scope of the present disclosure. Moreover, it is to be appreciated that at least one of the seats 152A, 154A, 152B, 154B, 152C, 154C is a mounting point as discussed herein. All of the terms, phrases, etc. regarding the seats 152A, 154A, 152B, 154B, 152C, 154C are to be broadly interpreted. As such, each shown example of a spool-like, cylindrical, etc. shaped device which has a rim or ridge at at least one end and/or a narrower, tapered, etc. waist segment is a non-limiting example.

Turning to the shown example, each of the right seats 152A, 154A, 152B, 154B, 152C, 154C has a respective vertical axis Y'. It is to be appreciated within the shown example, the respective vertical axes Y' of the right seats 152A, 154A, 152B, 154B, 152C, 154C are aligned and coaxial. Of course, it is to be appreciated that such positioning of the axes is just an example and that different positionings of the axes are contemplated and within the scope of the present disclosure.

Each of the right seats 152A, 154A, 152B, 154B, 152C, 154C has a respective middle waist segment 158. Within the shown example, each waist segment 158 has a general cylindrical shape. Of course, it is to be appreciated that each waist segment 158 can be varied (e.g., annular tapering, annular chamfers or similar) and that such variation is within the scope of the present disclosure.

Also, within the shown example, seat ends of the right seats 152A, 154A, 152B, 154B, 152C, 154C are oblong or oval in shape when viewed along the axis Y' (e.g., the seat axis, or in the shown example a spool axis). See FIG. 11. So, each of the right seats 152A, 154A, 152B, 154B, 152C, 154C has a respective oval shape as viewed along a respective seat axis. It is to be appreciated that the seat end shape may be varied (e.g., circular) and/or appendages to the seat end may be added and that such shape variation and/or appendage addition is within the scope of the present disclosure.

As viewed within FIG. 9, each first right seat (i.e., 152A, 152B, 152C) is located above the distal end segment 140 of the respective left arm (i.e., 138A, 138B, 138C). As viewed within FIG. 9, each second right seat (i.e., 154A, 154B, 154C) is located below the distal end segment 140 of the respective right arm (i.e., 138A, 138B, 138C). As discussed further following, each of the right seats (i.e., 152A, 154A, 152B, 154B, 152C, 154C) is to receive a respective line hanging appliance (similar to the shown examples within FIGS. 7 and 8) such that the respective line hanging appliance rests within the respective middle waist segment 158 and extends to engage and hold a respective one of the line segments.

It is to be appreciated that the seats 142A-144C and 152A-154C may readily accommodate use for pass-through (e.g., transit) support. For example, each pair of seats (e.g., 142A and 152A, etc.) that are at the same height along the bracket 110 may easily be utilized with a pair of line hanging appliances for a line that passes-through/transits past the bracket 110. Each seat of the pair of seats (e.g., 142A and 152A) supports a respective line segment of the line that passes-through/transits past the bracket 110.

Attention is directed to FIG. 11, to again note that the arms 134A, 138A, 134B, 138B, 134C and 138C extend from the back portion 16. With the extending of the arms 134A, 138A, 1348, 1388, 134C and 138C, lines that pass-through or transit may be provided with support location(s) that are well away from the structure (e.g., a utility pole) to which the bracket 110 is attached.

Moreover, if the line that is passing-through/transiting is turning at the bracket 110, the bracket allows the overall turn angle to be bifurcated and distributed between the two points (e.g., a pair of seats such as 142A and 152A, etc.). As such, the angle of redirection at each support point is relatively lessened.

It is to be appreciated that the example bracket 110 shown in FIGS. 9-11 provides twelve locations for receiving respective line hanging appliances. Of course, it is to be appreciated that all of the possible locations for receiving respective line hanging appliances need not be used.

Figure 12:
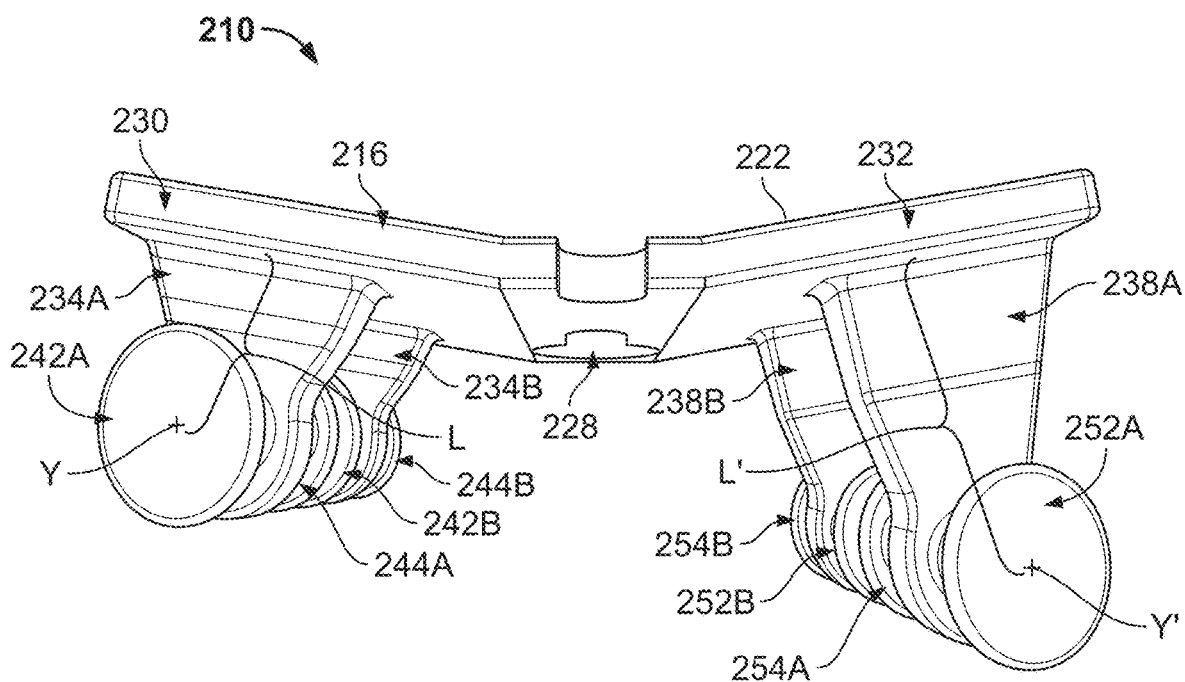
FIG. 12 is a top view picture of a third example of a multi-line suspending bracket, according to some embodiments.

FIG. 12 is a top view picture of a third example of a bracket 210. The third example bracket has some similarities to examples shown within FIGS. 1-5 and FIGS. 9-11. However, the bracket 210 also has some differences. The difference are example differences and as such the bracket 210 of FIG. 12 is to help illustrate variations that are possible and within the scope of the present disclosure. Also, the bracket 210 of FIG. 12 is to help illustrate that various combination of variations are possible and within the scope of the present disclosure.

It is to be appreciated that a sequential reference numeral numbering progression is used herein to identify similar structures among the several examples. Specifically, each next, sequential example utilizes the same, repeated suffix portion of a reference numeral for a similar structure. However, a sequential prefix digit of the reference numeral is increased for each sequential example embodiment that is presented. Thus, third example (FIG. 12) of the bracket is identified via reference numeral 210, which includes the same, repeated suffix portion "10" and the sequential prefix portion "2." Of course, the first example of FIGS. 1-5 did not need or include a prefix portion.

It is to be appreciated that in view of the above-mentioned commonality/similarity of reference numerals, it is to be appreciated that discussions of structures of one example have some general applicability to the similar structures of another example. Accordingly, it is to be understood that discussions of the different examples may be utilized for other examples.

Focusing again upon the bracket 210 of FIG. 12, it is to be noted that the bracket is for suspending multiple line segments at a single elevated location. The bracket 210 and has the following discussed structural aspects.

A back portion 216 that has a general cylindrical concave face 222 and a through-hole 228 for receiving a fastener. The back portion 216 has a left segment 230 and a right segment 232, as viewed within FIG. 12. A first left (as viewed in FIG. 12) arm 234A and a second left arm 234B extend from the back portion 216. A first right (as viewed in FIG. 12) arm 238A and second right arm 238B extend from the back portion 216.

First and second left seats 242A, 244A extend from the first left arm 234A and first and second left seats 242B, 244B extend from the second left arm 234B. First and second right seats 252A, 254A extend from the first right arm 238A. Also, first and second right seats 252B, 254B extend from the second right arm 238B. Note that the arms 234A, 238A, 234B and 238B extend from the back portion 216. With the extension of the arms 234A, 238A, 234B and 238B, lines that pass-through or transit past may be provided with support location(s) that are well away from the structure (e.g., a utility pole) to which the bracket 210 is attached. Moreover, if the line that is passing-through/transiting is turning at the bracket 210, the bracket allows the overall turn angle to be bifurcated and distributed between the two points (e.g., a pair of seats such as 242A and 252A, etc.). As such, the angle of redirection at each support point is relatively lessened.

As mentioned, the arms 234A, 238A, 234B and 238B extend from the back portion 216. However, it is to be noted that the example bracket 210 has a different extension lengths for different sets of the arms 234A, 238A, 234B and 238B. Within the shown example the arms 234A, 234B have a first extension length and the arm 238A, 238B have a second, different extension length. One example manner of measuring arm length is from a location of the respective arm (e.g., 234A) intersecting the back portion 216 to a location of the axis (e.g., Y) of the associated seats (e.g., 242A) upon the arm. See such length indicated with the designation L for the arms 234A, 234B, and with the designation L' for the arms 238A and 238B.

Within the shown example, the length L' for the right arms 238A, 238B is greater than the length L for the left arms 234A, 234B. It is to be appreciated that the length L may be of varied length and the length L' may be of varied length. Also, the difference between the length L and the length L' may be varied. Still further, the length L may be greater than the length L'. Even further, the lengths of the several arms 234A, 234B, 238A and 238B may be different and varied. Accordingly, such variations of lengths are within the scope of the present disclosure.

Figure 13:
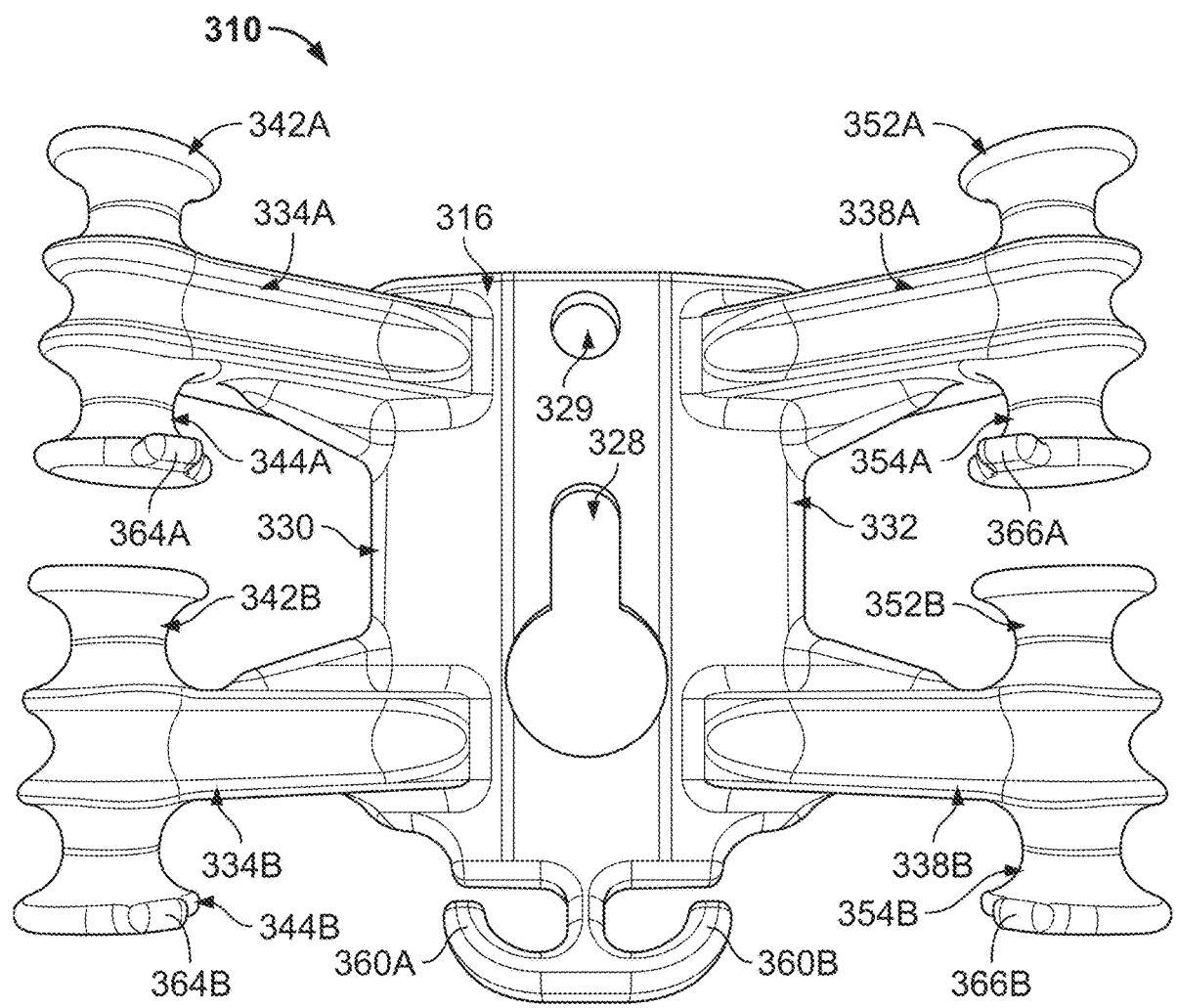
FIG. 13 is a front, plan view picture of a fourth example of a multi-line suspending bracket, according to some embodiments.
Figure 14:
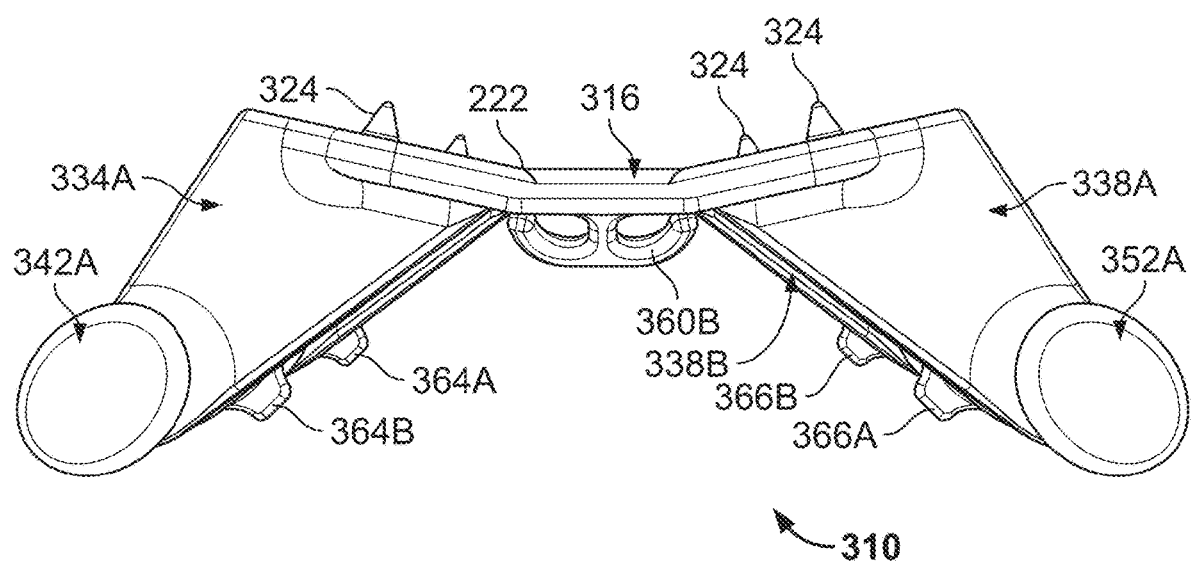
FIG. 14 is a top view picture of the example bracket of FIG. 13, according to some embodiments.

FIG. 13 is a front, plan view picture of a fourth example of a bracket 310. FIG. 14 is a top view picture of the example bracket of FIG. 13. The fourth example bracket 310 has some similarities to the previously discussed examples. However, the bracket 310 also has some differences. The difference are example differences and as such the bracket 310 of FIGS. 13 and 14 is to help illustrate variations that are possible and within the scope of the present disclosure. Also, the bracket 310 of FIGS. 13 and 14 is to help illustrate that various combination of variations are possible and within the scope of the present disclosure.

Again, it is to be appreciated that the sequential reference numeral numbering progression is used to identify similar structures among the several examples. It is to be appreciated that in view of the above-mentioned commonality/similarity of reference numerals, it is to be appreciated that discussions of structures of one example have some general applicability to the similar structures of another example. Accordingly, it is to be understood that discussions of the different examples may be utilized for other examples.

Focusing again upon the bracket 310 of FIG. 13, it is to be noted that the bracket is for suspending multiple line segments at a single elevated location. The bracket 310 and has the following discussed structural aspects.

A back portion 316 that has a general cylindrical concave face 322 (see FIG. 14), one or more spikes 324 and a through-hole 328 (see FIG. 13) for receiving a fastener. It is to be noted at a second through-hole 329 for receiving a fastener is provided within the back portion 316. The use of the second through-hole 329 is optional. However, the presence of the second through-hole 329 allows the optional use and such may be useful for some locations.

The back portion 316 has a left segment 330 and a right segment 332, as viewed within FIG. 13. A first left arm 334A and a second left arm 334B extend from the back portion 316. A first right arm 338A and second right arm 338B extend from the back portion 316.

First and second left seats 342A, 344A extend from the first left arm 334A and first and second left seats 342B, 344B extend from the second left arm 334B. First and second right seats 352A, 354A extend from the first right arm 338A. Also, first and second right seats 352B, 354B extend from the second right arm 338B. The arms 334A, 338A, 334B and 338B extend from the back portion 316. The extension from the back portion 316 is at an angle. Also, the arms 334A, 338A, 334B and 338B extend outboard, in respective directions, of the back portion 316.

Within the shown example, two hooks 360A, 360B are provided. The hooks 360A, 360B are similar to, but different from, the hooks 60A, 60B of the example shown in FIGS. 1-5.

Also noted that the arms 334A, 338A, 334B and 338B have contours, thicknesses, widths, lengths, angles, etc. that may be different from the arms of the other examples.

Recall that it was mentioned within the previous discussions of the examples (e.g., the example shown in FIGS. 1-5) that seat end shapes may be varied and/or appendages to the seat end may be added. The bracket 310 (FIGS. 13 and 14) provides some examples of such. See that appendages 364A, 364B, 366A, 366B are present on four seats (i.e., 344A, 344B, 354A, 354B). Within the shown example, these four seats (i.e., 344A, 344B, 354A, 354B) are the seats extending downward from the respective arms (i.e., 334A, 334B, 338A, 338B).

The appendages 364A, 364B, 366A, 366B have a finger-like shape. Also, the appendages 364A, 364B, 366A, 366B are curved upward. The shape, position, etc. may help retain respective line hanging appliances.

Figure 15:
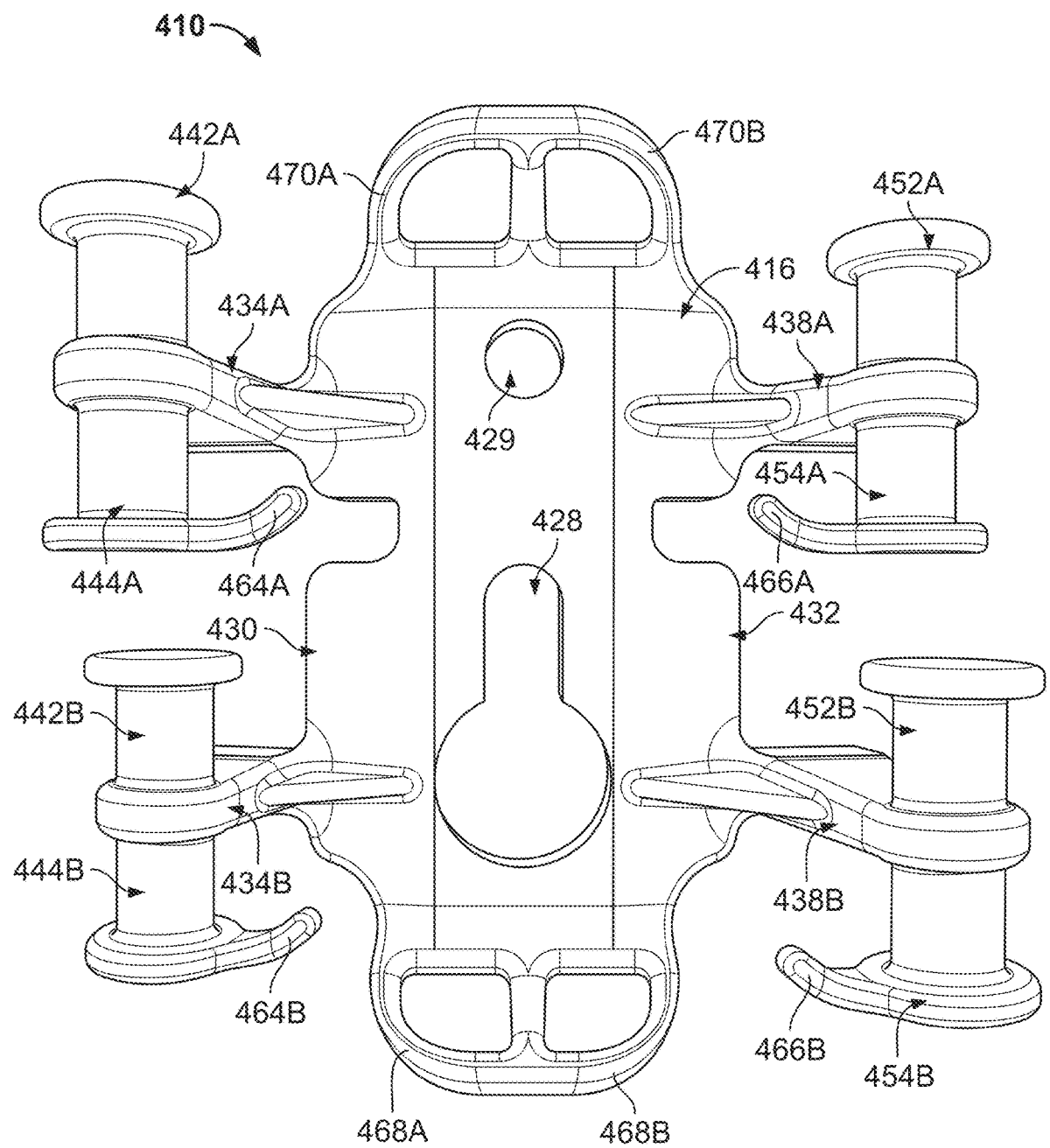
FIG. 15 is a front, plan view picture of a fifth example of a multi-line suspending bracket, according to some embodiments.
Figure 16:
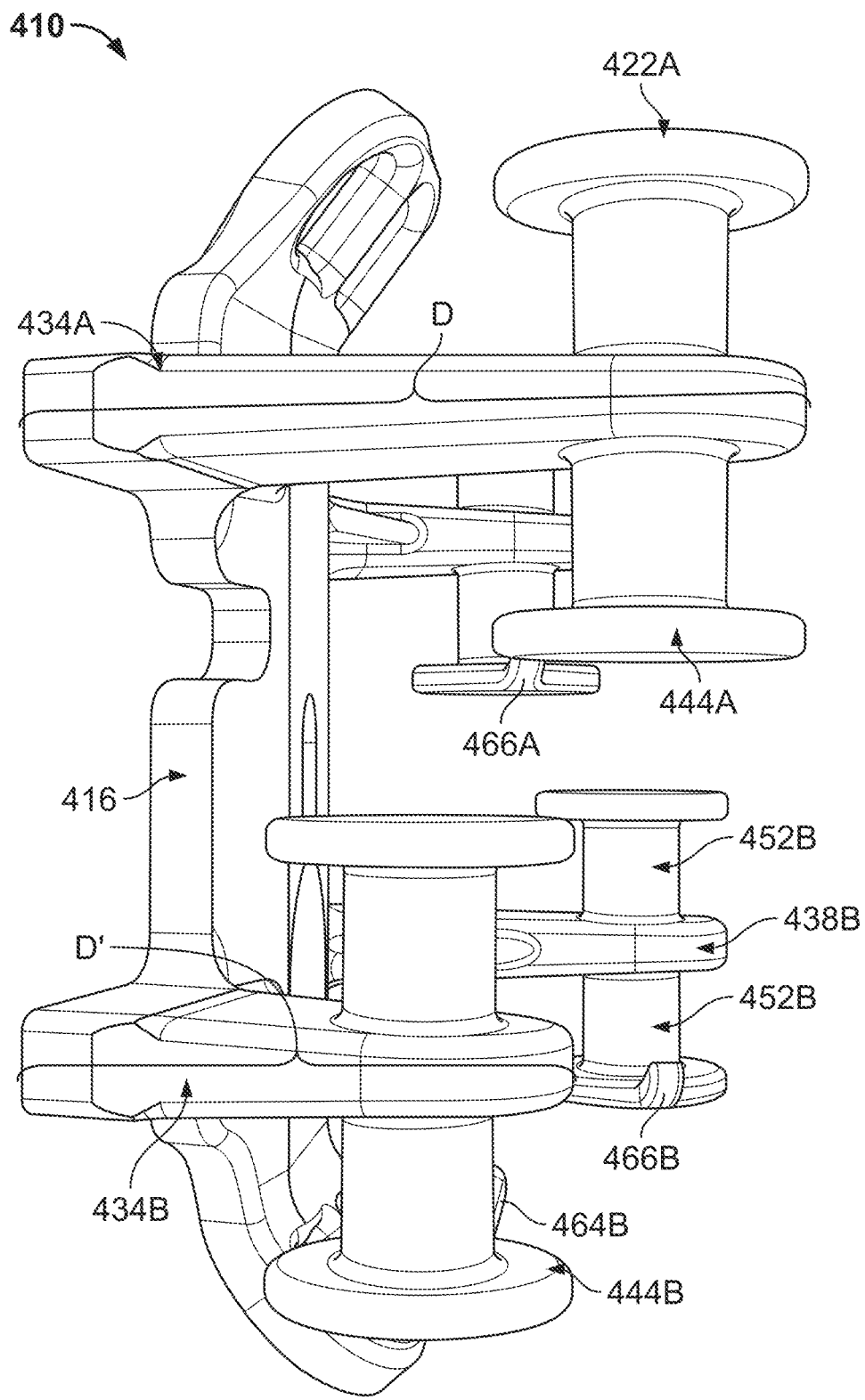
FIG. 16 is a left perspective view picture of the example bracket of FIG. 15, according to some embodiments.

FIG. 15 is a front, plan view picture of a fifth example of a bracket 410. FIG. 16 is a left perspective view picture of the example bracket 410 of FIG. 15. The fifth example bracket 410 has some similarities to the previously discussed examples. However, the bracket 410 also has some differences. The difference are example differences and as such the bracket 410 of FIGS. 15 and 16 is to help illustrate variations that are possible and within the scope of the present disclosure. Also, the bracket 410 of FIGS. 15 and 16 is to help illustrate that various combination of variations are possible and within the scope of the present disclosure.

Again, it is to be appreciated that the sequential reference numeral numbering progression is used to identify similar structures among the several examples. It is to be appreciated that in view of the above-mentioned commonality/similarity of reference numerals, it is to be appreciated that discussions of structures of one example have some general applicability to the similar structures of another example. Accordingly, it is to be understood that discussions of the different examples may be utilized for other examples.

Focusing again upon the bracket 410 of FIGS. 15 and 16, it is to be noted that the bracket is for suspending multiple line segments at a single elevated location. The bracket 410 and has the following discussed structural aspects.

A back portion 416 that has a through-hole 428 for receiving a fastener. It is to be noted at a second through-hole 429 for receiving a fastener is provided within the back portion 416. The use of the second through-hole 429 is optional. However, the presence of the second through-hole 429 allows the optional use and such may be useful for some locations.

The back portion 416 has a left segment 430 and a right segment 432, as viewed within FIG. 15. A first left arm 434A and a second left arm 434B extend from the back portion 416. A first right arm 438A and second right arm 438B extend from the back portion 416.

First and second left seats 442A, 444A extend from the first left arm 434A and first and second left seats 442B, 444B extend from the second left arm 434B. First and second right seats 452A, 454A extend from the first right arm 438A. Also, first and second right seats 452B, 454B extend from the second right arm 438B. The arms 434A, 438A, 434B and 438B extend from the back portion 416. The extension from the back portion 416 is at an angle. Also, the arms 434A, 438A, 434B and 438B extend outboard, in respective directions, of the back portion 416. Also note that the arms 434A, 434B, 438A and 438B have contours, thicknesses, widths, lengths, angles, etc. that may be different from the arms of the other examples.

Within the shown example the arms 434A, 438B have a first extension length D and the arm 434B, 438A have a second, different extension length D'. See FIG. 16 and then also FIG. 15. To be clear, one of the left arms (e.g., 434A) and one of the right arms (e.g., 438B) have the first extension length D, and one of the left arms (e.g., 434B) and one of the right arms (e.g., 438A) have the second extension length D'. It is to be appreciated that the length D may be of varied length and the length D' may be of varied length. Also, the difference between the length D and the length D' may be varied. Within an example, the first extension length D is greater than the second extension length D'. One example manner of measuring arm length is from a back edge of the respective arm (e.g., 434A) to a front edge of the respective arm. See FIG. 16. It is to be appreciated that, the lengths of the several arms 434A, 438A, 434B and 438B may be different and varied. Accordingly, such variations of lengths are within the scope of the present disclosure.

Recall that it was mentioned within some of the previous examples that seat end shapes may be varied and/or appendages to the seat end may be added. The bracket 410 provides some examples of such. See that appendages 464A, 464B, 466A, 466B are present on four seats (i.e., 444A, 444B, 454A, 454B). Within the shown example, these four seats (i.e., 444A, 444B, 454A, 454B) are the seats extending downward from the respective arms (i.e., 434A, 434B, 438A, 438B).

The appendages 464A, 464B, 466A, 466B have a finger-like shape. Also, the appendages 464A, 464B, 466A, 466B are curved upward. The shape, position, etc. may help retain respective line hanging appliances.

Within the shown example, a pair of lower eyelets 468A, 468B and a pair of upper eyelets 470A, 470B are provided. The pair of lower eyelets 468A, 468B extend downward and outward from the back portion 416. The pair of upper eyelets 470A, 470B extend upward and outward from the back portion 416. The eyelets 468A, 468B, 470A, 470B provide additional options for attaching respective line hanging appliances.

Figure 17:
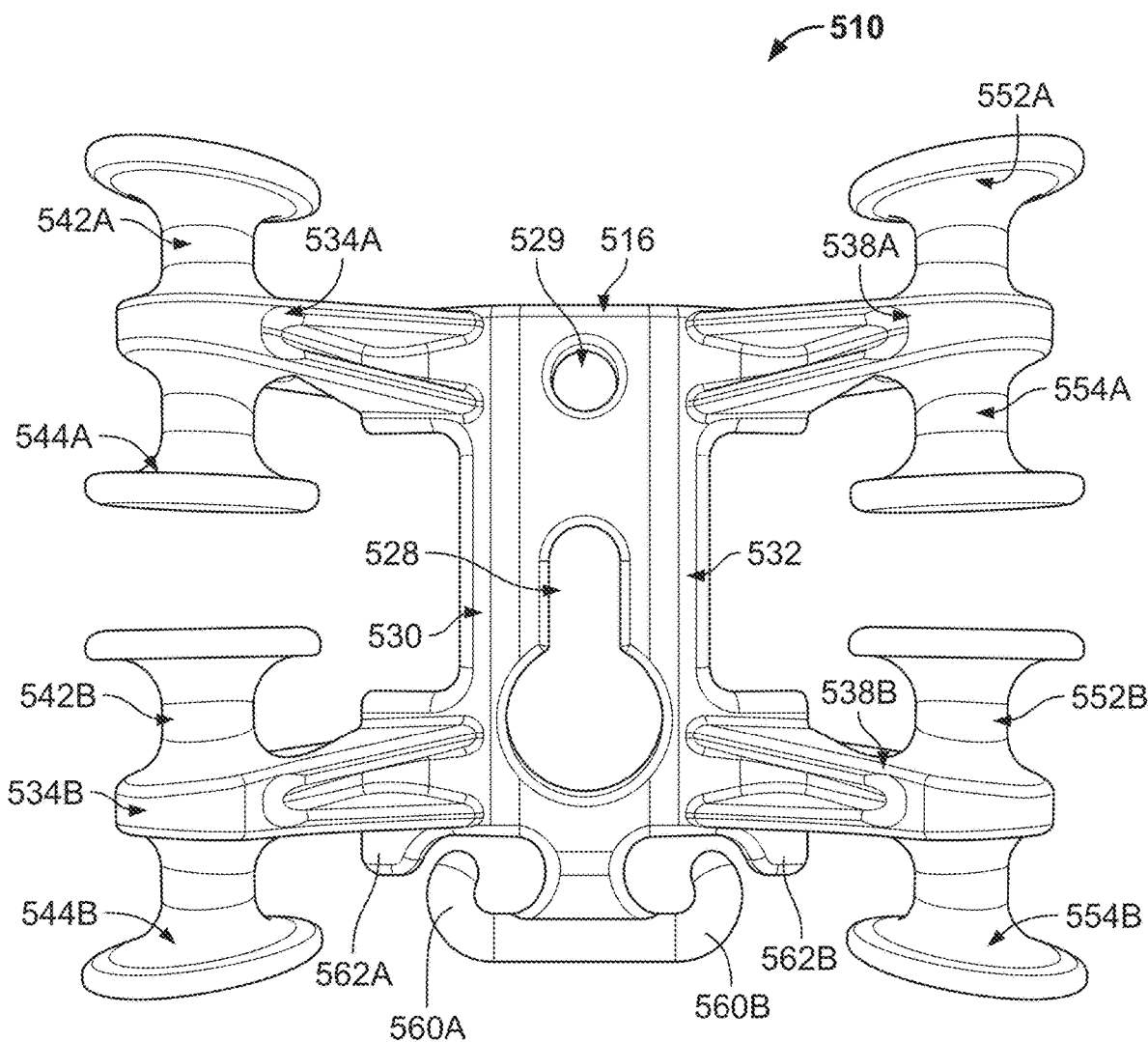
FIG. 17 is a front, plan view picture of a sixth example of a multi-line suspending bracket, according to some embodiments.

FIG. 17 is a front, plan view picture of a sixth example of a bracket 510. The sixth example bracket 510 has some similarities to the previously discussed examples. However, the bracket 510 also has some differences. The differences are example differences and as such the bracket 510 of FIG. 17 is to help illustrate variations that are possible and within the scope of the present disclosure. Moreover, the bracket 510 includes a combination of some similarities to portions of the previously discussed examples. As such, the bracket 510 of FIG. 17 is to help illustrate that various combinations of variations are possible and within the scope of the present disclosure.

Again, it is to be appreciated that the sequential reference numeral numbering progression is used to identify similar structures among the several examples. It is to be appreciated that in view of the above-mentioned commonality/similarity of reference numerals, it is to be appreciated that discussions of structures of one example have some general applicability to the similar structures of another example. Accordingly, it is to be understood that discussions of the different examples may be utilized for other examples.

Focusing again upon the bracket 510 of FIG. 17, it is to be noted that the bracket is for suspending multiple line segments at a single elevated location. See the example of such within FIG. 18.

The bracket 510 and has the following discussed structural aspects.

A back portion 516 that has a through-hole 528 for receiving a fastener. It is to be noted at a second through-hole 529 for receiving a fastener is provided within the back portion 516. The use of the second through-hole 529 is optional. However, the presence of the second through-hole 529 allows the optional use and such may be useful for some locations.

The back portion 516 has a left segment 530 and a right segment 532, as viewed within FIG. 17. A first left arm 534A and a second left arm 534B extend from the back portion 516. A first right arm 538A and second right arm 538B extend from the back portion 516.

First and second left seats 542A, 544A extend from the first left arm 534A and first and second left seats 542B, 544B extend from the second left arm 534B. First and second right seats 552A, 554A extend from the first right arm 538A. Also, first and second right seats 552B, 554B extend from the second right arm 538B. The arms 534A, 538A, 534B and 538B extend from the back portion 516. The extension from the back portion 516 is at an angle. Also, the arms 534A, 538A, 534B and 538B extend outboard, in respective directions, of the back portion 516. Also note that the arms 534A, 538A, 534B and 538B have contours, thicknesses, widths, lengths, angles, etc. that may be different from the arms of the other examples.

Within the shown example, two hooks 560A, 560B are provided. Within the shown example, a blocking protrusion 562A, 562B is associated with each respective hook 560A, 560B, near the respective open end of the respective hook.

Figure 18:
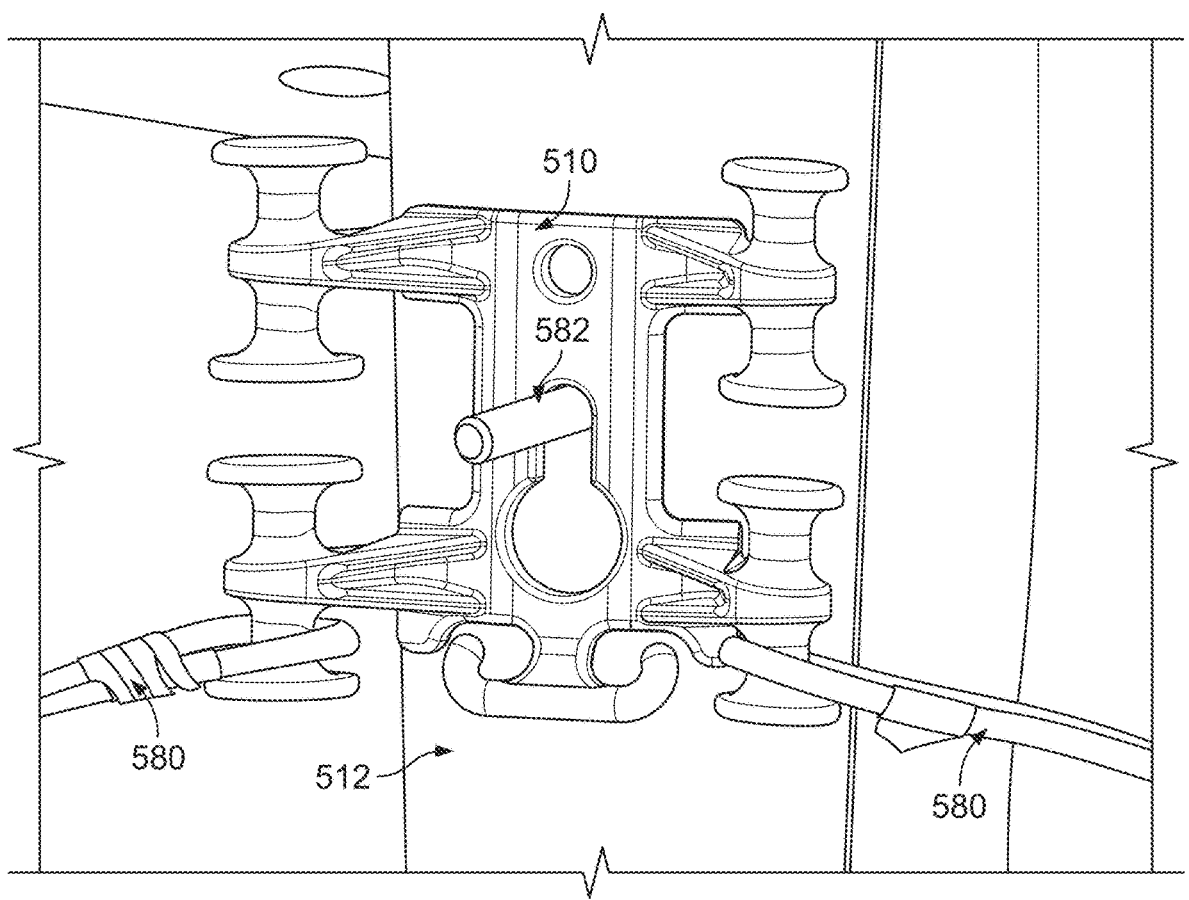
FIG. 18 is picture of the example bracket of FIG. 17, an example structure to which the example bracket is engaged and secured, and two example line hanging appliances received upon portions of the bracket, according to some embodiments.

FIG. 18 shows the example bracket 510 of FIG. 17 mounted to an example structure 512 (e.g., a pole) to which the example bracket is engaged and secured via a fastener 582 (e.g., a bolt and nut combination), and two example line hanging appliances 580 received upon portions of the bracket.

Focusing upon FIGS. 6, 7, 8 and 18, which show some examples of the bracket within some example use environments and with some example line hanging appliances, it is to be appreciated and understood that all of the discussed example brackets, and also all of the brackets within the scope of the present disclosures, are usable within the example use environments and with the example line hanging appliances. Moreover, all of brackets within the scope of the present disclosure are usable within various use environments and with various line hanging appliances. Accordingly, such variations, options, etc. are within the scope of the present disclosure. Again, it is to be appreciated that each of the seats discussed herein is a mounting point as discussed herein. All of the terms, phrases, etc. regarding the seats are to be broadly interpreted. As such, each shown example of a cylindrical or hourglass shaped device which has a rim or ridge at each end is a non-limiting example.

It is to be appreciated that various examples and/or aspects are provided by the present disclosure. Some of such are presented above. Following is a non-exhaustive recitation of additions of such, so that such can be appreciated.

At least some of the first and second left seats and at least some of the first and second right seats has a respective oval shape as viewed along a respective seat axis. At least some of the first and second left seats and at least some of the first and second right seats has a respective extending appendage. Each extending appendage includes a curved finger-like shape. The back portion has at least one extending spike.

The left arm is a first left arm. The right arm is a first right arm. The bracket includes plural left arms. Each left arm extends in an outboard direction from the left segment of the back portion. Each left arm extends away from the back portion at an acute angle relative to the span of the back portion adjacent to the left segment. Each left arm terminates at a respective distal end segment. The bracket includes plural right arms. Each right arm extends in an outboard direction from the right segment of the back portion. Each right arm extends away the back portion at an acute angle relative to the span of the back portion adjacent to the right segment. Each right arm terminates at a respective distal end segment. The bracket includes respective first and second left seats that extend from the distal end segment of each respective left arm. Each of the left seats has a middle waist segment. Each first left seat is located above the distal end segment of the respective left arm. Each second left seat is located below the distal end segment of the respective left arm. Each of the left seats is to receive a respective line hanging appliance such that the respective line hanging appliance rests within the respective middle waist segment and extends to engage and hold a respective one of the line segments. The bracket includes respective first and second right seats extending from the distal end segment of each respective right arm. Each of the right seats has a middle waist segment. The first right seat is located above the distal end segment of the respective right arm. The second right seat is located below the distal end segment of the respective right arm. Each of the right seats is to receive a respective line hanging appliance such that the respective line hanging appliance rests within the respective middle waist segment and extends to engage and hold a respective one of the line segments.

A hook extends from the back portion to receive a respective line hanging appliance such that the respective line hanging appliance rests within the hook and extends to engage and hold a respective one of the line segments. The hook is a first hook. The bracket includes multiple hooks. Each hook extends from the back portion to receive a respective line hanging appliance such that the respective line hanging appliance rests within the hook and extends to engage and hold a respective one of the line segments. The back portion has a lower segment. The hook extends from the lower segment of the back portion. An eyelet extends from the back portion to receive a respective line hanging appliance such that the respective line hanging appliance rests within the eyelet and extends to engage and hold a respective one of the line segments.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A bracket for suspending multiple line segments at an elevated location, the bracket comprising:
    a back portion to engage against a supporting surface at the elevated location, the back portion configured to permit a single fastener to penetrate the supporting surface and retain the bracket at the elevated location, and the back portion having a left segment and a right segment;
    plural left arms, each left arm extending from the left segment of the back portion, and each left arm terminating at a distal end segment;
    plural right arms, each right arm extending from the right segment of the back portion, and each right arm terminating at a distal end segment;
    at each left arm, a first left seat and a second left seat extending from the distal end segment of the respective left arm, the first left seat being located above the respective left arm and the second left seat being located below the respective left arm, each of the left seats having an hour-glass shape that includes an oval-shaped waist segment and an oval-shaped free end such that each of the left seats have a varying cross sectional profile to receive a respective line hanging appliance such that the respective line hanging appliance rests within the respective seat and extends to engage and hold a respective one of the multiple line segments; and
    at each right arm, a first right seat and a second right seat extending from the distal end segment of the respective right arm, the first right seat being located above the respective right arm and the second right seat being located below the respective right arm, each of the right seats having an hour-glass shape that includes an oval-shaped waist segment and an oval-shaped free end such that each of the right seats have a varying cross sectional profile to receive a respective line hanging appliance such that the respective line hanging appliance rests within the respective seat and extends to engage and hold a respective one of the multiple line segments.

2. The bracket as set forth in claim 1, wherein the varying cross sectional profile of each first left seat varies along a seat axis.

3. The bracket as set forth in claim 1, wherein at least one of the first left seats, the second left seats, the first right seats, or the second right seats has an extending appendage.

4. The bracket as set forth in claim 1, wherein the back portion has at least one extending spike to engage the supporting surface.

5. The bracket as set forth in claim 2, wherein the varying cross sectional profile of at least one of the second left seats varies along the seat axis.

6. The bracket as set forth in claim 1, including a hook that extends from the back portion to receive a respective line hanging appliance such that the respective line hanging appliance rests within the hook and extends to engage and hold a respective one of the multiple line segments.

7. The bracket as set forth in claim 6, wherein the back portion has a lower segment, and the hook extends from the lower segment of the back portion.

8. A bracket for suspending multiple line segments at an elevated location, the bracket comprising:
- a back portion to engage against a supporting surface at the elevated location, the back portion having a left segment and a right segment, and the back portion having a span extending between the left segment and the right segment;
- plural left arms, each left arm extending in an outward direction from the left segment of the back portion, each left arm extending away from the back portion at an acute angle relative to the span of the back portion adjacent to the left segment, and each left arm terminating at a distal end segment;
- plural right arms, each right arm extending in an outward direction from the right segment of the back portion, each right arm extending away from the back portion at an acute angle relative to the span of the back portion adjacent to the right segment, and each right arm terminating at a distal end segment;
- at each left arm, a first left seat and a second left seat extending from the distal end segment of the respective left arm, the first left seat being located above the respective left arm and the second left seat being located below the respective left arm, each of the left seats having an hour-glass shape that includes an oval-shaped narrowed waist segment and an oval-shaped free end, each of the narrowed waist segments to receive a respective line hanging appliance such that the respective line hanging appliance rests within the respective narrowed waist segment and extends to engage and hold a respective one of the multiple line segments; and
- at each right arm, a first right seat and a second right seat extending from the distal end segment of the respective right arm, the first right seat being located above the respective right arm and the second right seat being located below the respective right arm, each of the right seats having an hour-glass shape that includes an oval-shaped narrowed waist segment and an oval-shaped free end, each of the narrowed waist segments to receive a respective line hanging appliance such that the respective line hanging appliance rests within the respective narrowed waist segment and extends to engage and hold a respective one of the multiple line segments.

9. The bracket as set forth in claim 8, wherein the narrowed waist segment of each first left seat narrows along a seat axis.

10. The bracket as set forth in claim 8, wherein the back portion has at least one extending spike to engage the supporting surface.

11. A bracket for suspending multiple line segments at an elevated location, the bracket comprising:
- a back portion to engage against a supporting surface at the elevated location, the back portion having a left segment and a right segment, and the back portion having a span extending between the left segment and the right segment;
- plural left arms, each left arm extending in an outward direction from the left segment of the back portion, each left arm extending away from the back portion at an acute angle relative to the span of the back portion adjacent to the left segment, and each left arm terminating at a distal end segment;
- plural right arms, each right arm extending in an outward direction from the right segment of the back portion, each right arm extending away from the back portion at an acute angle relative to the span of the back portion adjacent to the right segment, and each right arm terminating at a distal end segment;
- at each left arm, a first left seat extending from the distal end segment of the respective left arm along a line to a flared oval-shaped free end, wherein an oval-shaped waist segment between the distal end segment and the flared oval-shaped free end is tapered such that at least one line hanging appliance rests within the oval-shaped waist segment and extends to engage and hold at least one of the multiple line segments;
- at each left arm, a second left seat extending from the distal end segment of the respective left arm along a line to a flared oval-shaped free end, wherein an oval-shaped waist segment between the distal end segment and the flared oval-shaped free end is tapered such that at least one line hanging appliance rests within the oval-shaped waist segment and extends to engage and hold at least one of the multiple line segments, the first left seat being located above the respective left arm and the second left seat being located below the respective left arm;
- at each right arm, a first right seat extending from the distal end segment of the respective right arm along a line to a flared oval-shaped free end, wherein an oval-shaped waist segment between the distal end segment and the flared oval-shaped free end is tapered such that at least one line hanging appliance rests within the oval-shaped waist segment and extends to engage and hold at least one of the multiple line segments; and
- at each right arm, a second right seat extending from the distal end segment of the respective right arm along a line to a flared oval-shaped free end, wherein an oval-shaped waist segment between the distal end segment and the flared oval-shaped free end is tapered such that at least one line hanging appliance rests within the oval-shaped waist segment and extends to engage and hold at least one of the multiple line segments, the first right seat being located above the respective right arm and the second right seat being located below the respective right arm.

12. The bracket as set forth in claim 11, wherein the tapered oval-shaped waist segment of each first left seat tapers.

13. The bracket as set forth in claim 11, wherein the back portion has at least one extending spike to engage the supporting surface.

14. The bracket as set forth in claim 11, wherein the back portion is configured to permit at least one fastener to penetrate the supporting surface and retain the bracket at the elevated location.

15. The bracket as set forth in claim 11, including a hook that extends from the back portion to receive at least one line hanging appliance such that the at least one line hanging appliance rests within the hook and extends to engage and hold at least one of the multiple line segments.

* * * * *